US007123630B1

United States Patent
Ueno

(10) Patent No.: US 7,123,630 B1
(45) Date of Patent: Oct. 17, 2006

(54) BEARER INTEGRATION METHOD AND APPARATUS FOR THE BEARER INTEGRATION METHOD

(75) Inventor: Tomoyuki Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 749 days.

(21) Appl. No.: 09/625,717

(22) Filed: Jul. 25, 2000

(30) Foreign Application Priority Data

Jul. 26, 1999 (JP) .................................. 11-210552

(51) Int. Cl.
H04J 3/06 (2006.01)
H04J 3/04 (2006.01)

(52) U.S. Cl. ....................................... 370/517; 370/535

(58) Field of Classification Search ................. 370/335, 370/336, 337, 342, 345, 347, 350, 441, 442, 370/479, 498, 503, 508, 516, 517
See application file for complete search history.

(56) References Cited

U.S. PATENT DOCUMENTS

| 5,430,774 A | * | 7/1995 | Dupuy ........................ 375/240 |
| 5,559,796 A | * | 9/1996 | Edem et al. ................. 370/412 |
| 5,598,413 A | * | 1/1997 | Sansom et al. ............. 370/468 |

* cited by examiner

*Primary Examiner*—Huy D. Vu
*Assistant Examiner*—Daniel Ryman
(74) *Attorney, Agent, or Firm*—Katten Muchin Rosenman LLP

(57) ABSTRACT

A bearer integration method for integrating a plurality of bearer services into a wireless channel by performing time-division multiplexing/demultiplexing is provided, in which bearer service data is input in synchronization with reference frame timing of a period T in a sending side, the bearer service data is delayed by one frame period by allocating delays A ($0 \leq A \leq T$) and A' ($=T-A$) between the sending side and a receiving side, the bearer service data is output in the receiving side, and the bearer service data is integrated into a wireless channel with another bearer service data in which delays B ($A \leq B \leq T$) and B' ($=T-B$) are allocated between the sending side and the receiving side.

12 Claims, 19 Drawing Sheets

BEARER INTEGRATION METHOD AND APPARATUS FOR THE BEARER INTEGRATION METHOD

BACKGROUND OF THE INVENTION

1. Field of the Invention

The present invention generally relates to a bearer integration method and an apparatus for the method. More particularly, the present invention relates to a bearer integration method and apparatus for integrating a plurality of bearer services to a wireless channel by time-division multiplexing/demultiplexing with baseband processing.

In a wireless communication in a CDMA system, since a plurality of terminal (mobile) stations use the same radio frequency, the CDMA system is controlled such that each terminal communicates with smaller power by using several technologies such as soft handoff. In addition, interference is suppressed so as to increase the number of available wireless channels. Further, in the CDMA system, a plurality of bearer services can be used via a terminal station. In this case, if a wireless channel is used for each of the bearer services, wireless channels and the power can not be used effectively. Therefore, a plurality of bearer services are integrated to a wireless channel by time-division multiplexing/demultiplexing with baseband processing. Thus, it is required to perform such bearer integration effectively with no instantaneous interruption.

2. Description of the Related Art

FIGS. 1–5 are figures for explaining a conventional technique. FIG. 1 shows a part of a mobile communication system of CDMA according to the conventional technique. In the figure, the numeral 1 indicates a mobile station or a terminal station, the numerals 8, 9 indicate terminal apparatuses (TE-A, TE-B) which are connected to the mobile station 1 wherein each terminal apparatus terminates a bearer service, the numeral 2 indicates a base station (BTS) for performing wireless communication with the mobile station 1 by CDMA, the numeral 3 indicates a base station control apparatus which performs bearer integration control and the like, the numeral 4 indicates a mobile exchange (MSC), the numeral 100 indicates a public network (PSTN), and the numerals 6, 7 indicate terminal apparatuses (TE-C, TE-D) which is connected to the public network 100 and terminate a bearer service.

The terminal apparatus 8 (TE-A) communicates with the terminal apparatus 6 (TE-C) by a bearer service. The mobile station 1 and the base station 2 use a wireless channel (for example m1). In this state, when a new bearer service is required between the terminal apparatus 9 (TE-B) and the terminal apparatus 7 (TE-D), if a wireless channel (for example m2) which can accommodate bearer services for two channels is available, the base station control apparatus 3 releases the wireless channel m1 which is already used and instructs the mobile station 1 and the base station 2 to use the wireless channel m2. Thus, the base station control apparatus 3 time-division multiplexes (bearer integrates) each bearer service for downward transmission and the mobile station 1 time-multiplexes each bearer service for upward transmission. Then, communication is carried out by using the wireless channel m2. When the base station control apparatus 3 cannot keep the wireless channel m2, it keeps a wireless channel (for example m3) which is available at the time and instructs the mobile station 1 and the base station 2 to use the wireless channels m1 and m3 for providing the bearer service between the terminal apparatus 9 (TE-B) and the terminal apparatus 7 (TE-D). After that, when the wireless channel m2 becomes available, the wireless channels m1 and m3 are released and the base station control apparatus 3 instructs the mobile station 1 and the base station 2 to use the wireless channel 2 m2.

FIG. 2 shows a basic configuration of a send/receive processing part (which does not support bearer integration) in the mobile station 1. This configuration is the same as the send/receive processing configuration for a circuit between the mobile station 1, the base station 2 and the base station control apparatus 3.

As shown in FIG. 2, the send/receive processing configuration includes a send processing part 10 and a receive processing part 30. The send processing part 10 includes a bearer interface part 11, a frame processing part 12 for adding a frame header identifier and the like for a wireless frame, an error correction encoding part 13 using convolutional code and the like, a symbol repeating part 14 for converting a symbol speed to a speed suitable for the chip rate even when using different data transmission rate, an interleaving part 15 for distributing each symbol in a frame unit, a spreading modulator 16 for spreading the symbol by a spreading code, a baseband filter 17, a D/A converter 18, a send IF part 19, a send wireless part 20, a send filter+ antenna part 21, and a send control part 22 for controlling above-mentioned each part.

The receive processing part 30 includes a receive filter+ antenna part 31, a receive wireless part 32, a receive IF part 33, an A/D converter 34, a baseband filter 35, a RAKE receive part 36 for synthesizing despreading code by a plurality of fingers, a deinterleaving part 37, a symbol extracting part 38 for extracting data from an input symbol by data extracting clock corresponding to a specified transmission rate, an error correction decoding part 39 using Viterbi decoding and the like, a bearer interface part 41 and a receive control part 42 for controlling above-mentioned each part.

The RAKE receive part 36 includes a finger part 361, a delayed lock loop (DLL) part 362, a searcher part 363, and a synthesizing part 364.

In the relation between the base station 2 and the base station control apparatus 3, the bearer interface part 11 of the downward line, the frame processing part 12, the frame processing part 40 and the bearer interface part 41 of the upward line are included in the side of the base station control apparatus 3. Other configuration is included in the side of the base station 2.

In the send processing part 10, data transmission rate can be changed by changing spreading codes set in the spreading modulator 16 and data transmission rate set in the symbol repeating part 14. In the receive processing part 30, a receive wireless channel and the data transmission rate can be changed by changing spreading codes set in the finger part 361 of the RAKE receive part 36 and data transmission rate set in the symbol extracting part 38.

FIG. 3 is a timing chart showing communication switching to a wireless channel of a different data transmission rate. Generally, a wireless channel is distinguished by using a different spreading code, and data of different transmission rates are spread by the same chip rate in CDMA. In addition, all wireless channels sent from a base station and each terminal station are synchronized with a system clock and frame timing of the system. The terminal station 1 can extract the chip rate by receiving a pilot channel sent from the base station 2 so as to generate the system clock. In addition, the terminal station 1 extracts frame timing by receiving a sync channel sent from the base station 2. Therefore, switching between wireless channels is realized only by switching the spreading code according to the frame timing. Thus, it is not necessary to re-synchronize the clock or the frame. Further, even when each data transmission rate of wireless channels to be switched is different, since a receive signal which can be received in the same chip rate can be realized by switching a setting which defines the number of chips for one bit according to the frame timing. Thus, switching without an instantaneous interruption can be achieved.

An example of wireless channel (transmission rate) switching will be described with reference to FIG. 3. As for the wireless channel A, assuming that the data rate=Ad and the spreading code=Ap. As for the wireless channel B, assuming that the data rate=Bd (=2×Ad) and the spreading code=Bp. In the send processing part 10, the send control part 22 sets the data transmission rate=Ad in the symbol repeating part 14 and sets the spreading code=Ap in the spreading modulator 16 for sending the wireless channel A. When wireless channel switching is requested in this state, the send control part 22 sets the transmission rate=Bd in the symbol repeating part 14 and sets the spreading code=Bp in the spreading modulator 16 in synchronization with a send switch timing t which is determined between the send processing part 10 and the receive processing part 30 beforehand. The wireless channel B is sent from this time.

In the receive processing part 30, the receive control part 42 sets the spreading code=Ap in the finger part 361 in the RAKE receive part 36 and sets the data transmission rate=Ad in the symbol extracting part 38 for receiving the wireless channel A before the switch timing t. When wireless channel switching is requested, the receive control part 42 sets the transmission rate=Bd in the symbol extracting part 38 and sets the spreading code=Bp in the finger part 361 in synchronization with a receive switch timing t which is determined between the send processing part 10 and the receive processing part 30 beforehand. The wireless channel B is received from this time. Since the receive processing part 30 performs receive processing according to the system clock/frame timing which are extracted, switching between wireless channels of different data rates can be realized without instantaneous interruption by synchronizing the receive switching timing t with the frame timing.

FIG. 4 shows a basic configuration of send/receive processing parts (which support bearer integration) of the mobile station 1 according to a conventional technique. This configuration shown in FIG. 4 is equivalent to a send/receive processing configuration for one circuit realized between the mobile station 1, the base station 2 and the base station control apparatus 3. The send processing part 10 includes two systems ("a" system and "b" system) from a bearer interface part 11 to a baseband filter 17, a bearer multiplexing part 23 for multiplexing two bearer services in synchronization with the frame timing at the time of bearer integration and a wireless channel multiplexing part 24 for multiplexing two wireless channels into a wireless signal of the same frequency before bearer integration. The receive processing part 30 includes two systems ("a" system and "b" system) from a baseband filter part 35 to a bearer interface part 41, a wireless channel demultiplexing part 43 for demultiplexing the two wireless channels which were multiplexed before bearer integration and a bearer demultiplexing part 44 for demultiplexing the two bearer services which were multiplexed at the time of bearer integration in synchronization with the frame timing.

In FIG. 4, processing routes for bearer services before bearer integration are shown with solid line arrows. In the send processing part 10, input bearer services (1) and (2) are spread into wireless channels m1 and m2 of the same frame timing by spreading codes of spreading modulation parts 16a and 16b respectively. After that, the wireless channel multiplexing part 24 multiplexes the wireless channels into wireless signals of the same frequency. Then, the wireless signals are sent. In the receive processing part 30 which receives the wireless signals, the wireless channel demultiplexing part 43 demultiplexes the multiplexed wireless signals into the wireless channels m1 and m2 and inputs the channels to the wireless channel processing parts 30a and 30b respectively. Then, the wireless channels m1 and m2 are demodulated by spreading codes of the RAKE receive parts 36a and 36b respectively. Then, the bearer services (1) and (2) are output.

Processing routes for bearer services when bearer integration is performed are shown with dotted line arrows in FIG. 4. When bearer integration is requested in the above-mentioned state, the bearer multiplexing part 23 starts time-division multiplexing for the bearer services 91), (2) with frame timing which is predetermined between the bearer multiplexing part 23 and the receive processing part 30. At the same time, a wireless channel m3 is set in the symbol repeating part 14b and the spreading modulation part 16b. After that, multiplexed data which is multiplexed by the bearer multiplexing part 23 is sent by the wireless channel m3 which has the same frame timing. In the receive processing part 30 which receives the wireless channel m3, the RAKE receive part 36b and the symbol extracting part 38b are set for the wireless channel m3 in synchronization with the frame timing which is predetermined between the receive processing part 20 and the send processing part 10. At the same time, the bearer demultiplexing part 44 starts to demultiplex the bearer service. Accordingly, the bearer services (1) and (2) provided by the wireless channels m1 and m2 are integrated into the bearer services (1) and (2) provided by the wireless channel m3 without instantaneous interruption.

As mentioned above, according to the conventional bearer integration method, bearer integration can be performed without instantaneous interruption as long as the bearer integration is performed between the wireless channels m1, m2, m3 which have the same frame timing.

Generally, in order to increase the number of wireless channels in CDMA wireless communication, each terminal station performs communication with smaller amount of power. In addition, the system provides frame offsets which are different for each wireless channel such that the wireless power is not concentrated in a time period. Therefore, in such a communication system, there is a very low possibility that a wireless channel of the same frame offset is unoccupied when performing bearer integration. In most cases, a wireless channel of a different frame offset should be assigned.

FIG. 5 shows a timing chart for performing bearer integration between wireless channels of different frame offsets according to the conventional technique. For example, a period T of a reference frame is 20 ms in which the reference frame is divided into 16 frame offsets.

Before bearer integration, in the bearer service A, data communication is performed in synchronization with a timing which is shifted by the frame offset A from the reference frame timing. In the bearer service B, data communication is performed in synchronization with a timing which is shifted by the frame offset B from the reference frame timing.

When integration of the bearer services A and B is requested, the base station control apparatus 3 acquires, for example, the wireless channel C which is unoccupied, and starts bearer integration control in synchronization with bearer integration timing t (which is shifted by the frame offset C from the reference frame timing). At this time, since the timing for capturing the bearer services A and B in the wireless channel C is changed to the frame offset C from the frame offsets A and B in the sending side, a gap (no signal interval) is generated between the wireless channels A, B and the wireless channel C as shown in FIG. 5. As a result, in the receiving side, there occurs instantaneous interruption in the bearer service data A and B respectively. Thus, it is impossible to perform bearer integration between wireless channels which have different frame offsets without instantaneous interruption.

According to the above-mentioned conventional method, bearer integration is not available for the bearer service which does not permit the instantaneous interruption. In addition, the number of the wireless channels can not be increased due to such a restriction.

SUMMARY OF THE INVENTION

It is an object of the present invention to provide a bearer integration method and an apparatus for the method for performing bearer integration efficiently without instantaneous interruption and increasing the number of wireless channels easily.

The above object of the present invention is achieved by a bearer integration method for integrating a plurality of bearer services into a wireless channel by performing time-division multiplexing/demultiplexing, the bearer integration method comprising the steps of:

inputting bearer service data in synchronization with reference frame timing of a period T in a sending side;

delaying the bearer service data by one frame period by allocating delays A ($0 \leq A \leq T$) and A' ($=T-A$) between the sending side and a receiving side;

outputting the bearer service data in the receiving side; and integrating the bearer service data into a wireless channel with another bearer service data in which delays B ($A \leq B \leq T$) and B' ($=T-B$) are allocated between the sending side and the receiving side.

According to the above-mentioned invention, possibility for being able to perform bearer integration increases in any communication system in which each wireless channel has a different frame offset. Thus, the number of wireless channels which can be used increases substantially.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
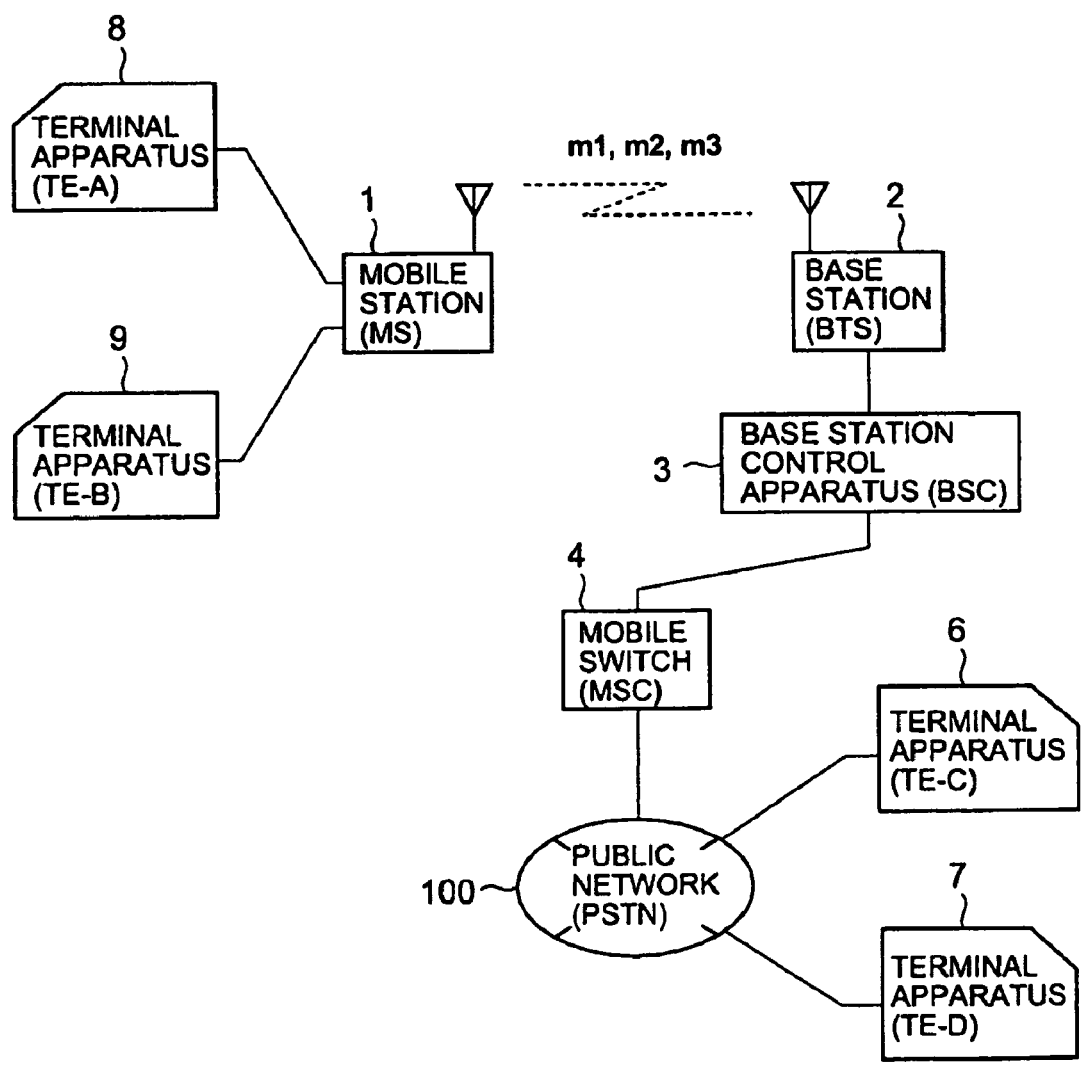
FIG. 1 shows a part of a mobile communication system of CDMA according to a conventional technique.

In the following, the principle of the present invention and detailed description of the preferred embodiments of the present invention will be provided with reference to the figures. In the drawings, the same reference numerals are used to identify corresponding features.

The principle of the present invention will be described first in the following.

Figure 6:
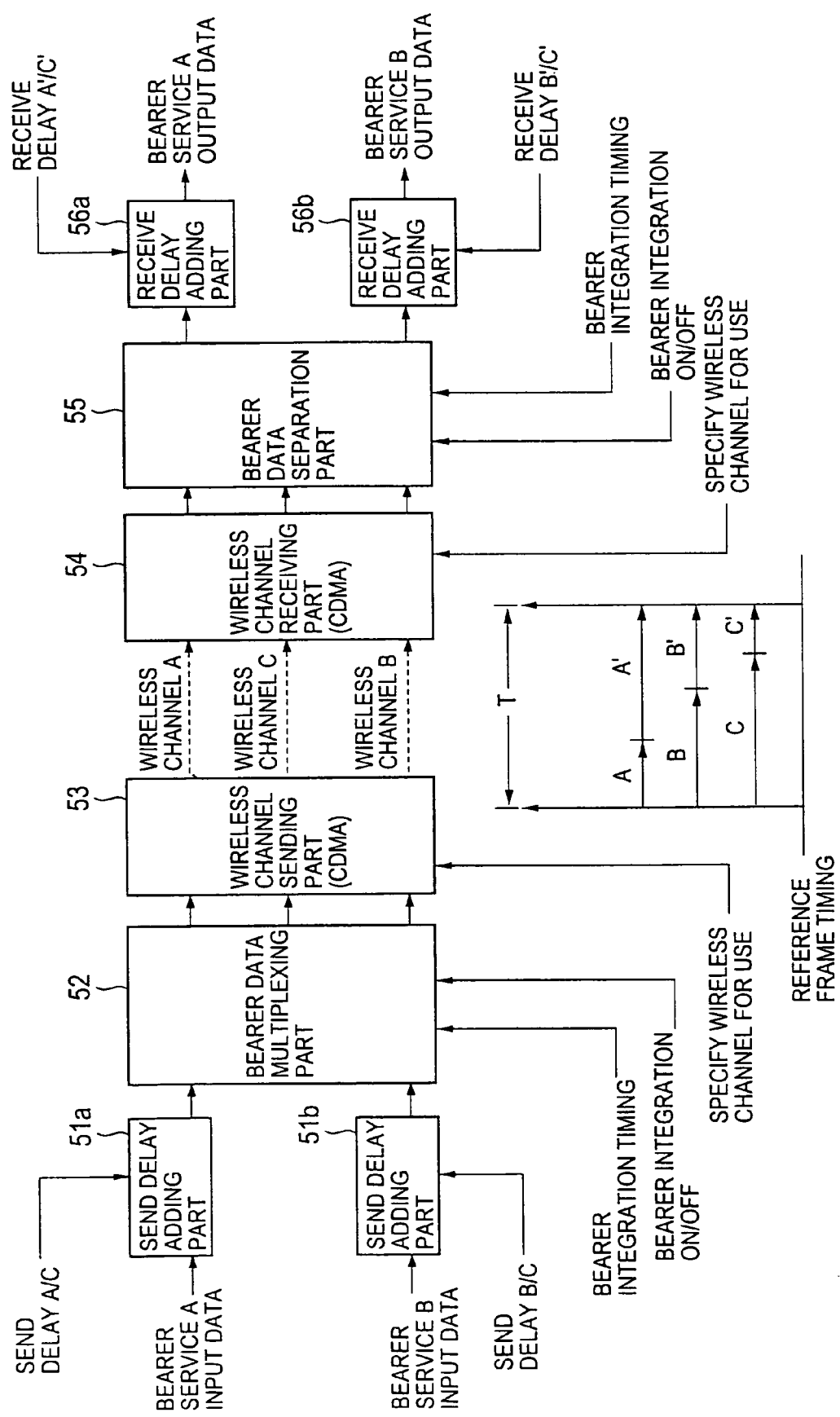
FIG. 6 is a block diagram for explaining a principle of the present invention.

FIG. 6 is a block diagram for explaining the principle of the present invention. In the present invention, input/output timing of bearer service data between the sending side and the receiving side is consistent with reference frame timing. Therefore, common input/output timing can be used for each bearer service data between bearer services which use wireless channels of different frame offsets.

In addition, bearer service data is delayed by one frame period by allocating delays A ($0 \leq A \leq T$) and A' ($=T-A$) between the sending side and the receiving side, and output in the receiving side. Therefore, even when delay allocation is changed such that the delay A in the sending side becomes larger, bearer service data which is input in synchronization with reference frame timing can be output after one frame period without instantaneous interruption between the data input this time and data input before. Then, when bearer service data A is integrated with another bearer service data B, the bearer service data A is integrated into a wireless channel having delay allocation of B (A≦B≦T) and B' (=T−B) between the sending side and the receiving side.

In the above-mentioned invention, when integrating bearer services in which each bearer service has different delay allocation, the bearer services may be integrated into a wireless channel which has a delay equal to or larger than the maximum delay in the bearer services.

Figure 7:
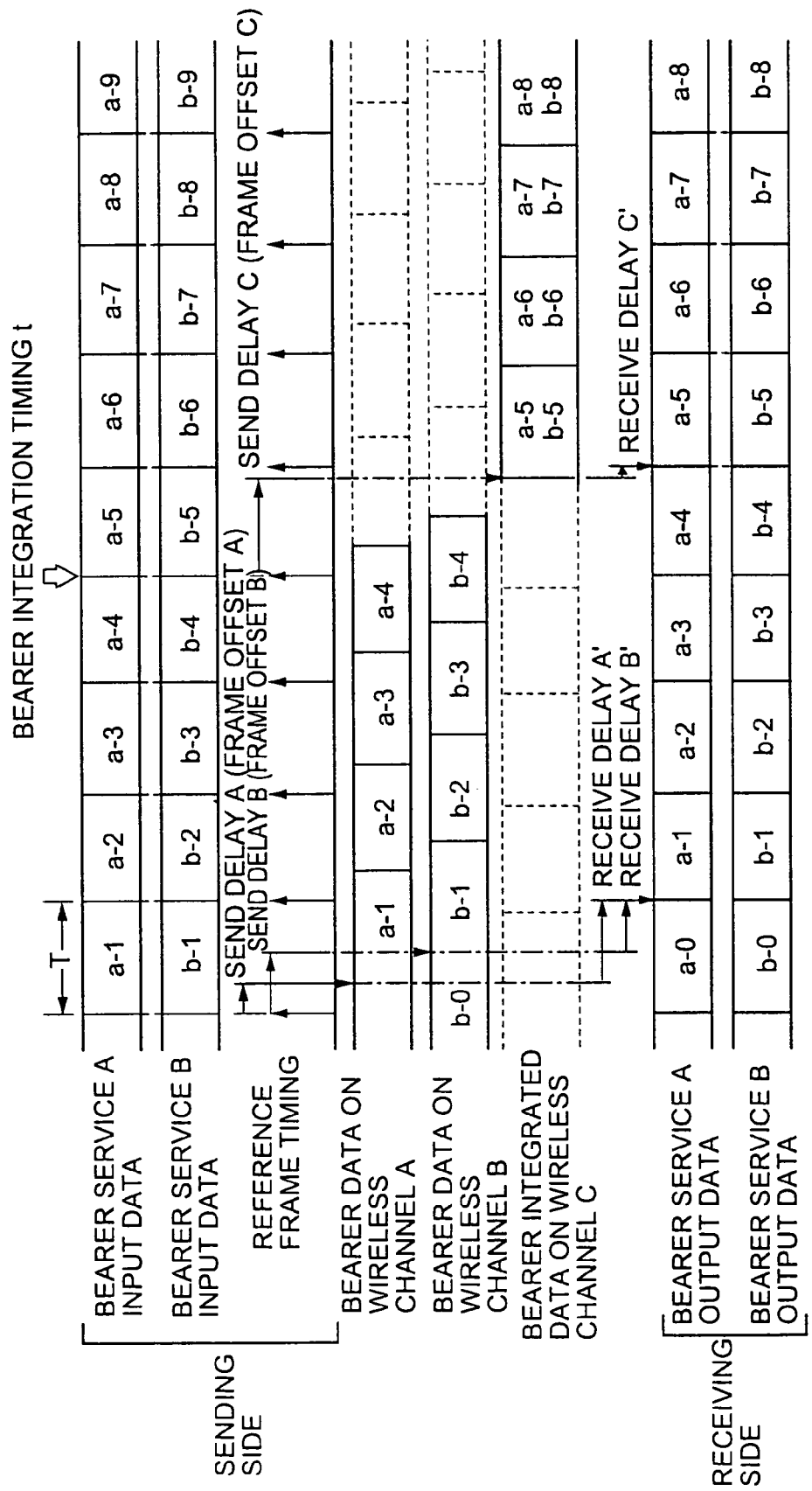
FIG. 7 is a timing chart for explaining the principle of the present invention.

As shown in FIG. 7, in the sending side, bearer frames a-1~a-4 and b-1~b-4 which are input before bearer integration are delayed by send delays A and B(>A) respectively. Then, they are sent by wireless channels A and B. In addition, bearer frames a-5~a-8 and b-5~b-8 which are input after bearer integration are delayed by common send delay C(≧A, B) respectively. Then, they are bearer integrated and sent by a wireless channel C.

In the receiving side, the bearer frames a-1~a-4 and b-1~b-4 which are received via the wireless channel A and B before bearer integration are delayed by receive delays A' (=T−A) and B' (=T−B) respectively, and output. In addition, the bearer frames a-5~a-8 and b-5~b-8 which are received after bearer integration via the wireless channel C are demultiplexed and are delayed by a common receive delay C' (=T−C), and output.

In regard to continuity of output data in receiving side, output of the bearer frames a-1 ~a-4 and b-1~b-4 is completed by one frame period from the bearer integration timing t. In addition, the bearer frames a-5~a-8 and b-5~b-8 which are input after bearer integration timing t are output continuously after one frame period from the bearer integration timing t. Therefore, according to the above-mentioned invention, each bearer service having each different delay allocation can be bearer integrated effectively without instantaneous interruption.

In the above-mentioned invention, two kinds and two systems of delay allocation may be set for each bearer service, and one or more bearer services having any delay allocation may be integrated into another bearer service having any delay allocation.

In the above-mentioned invention described with FIG. 6, delay can be allocated for one kind and one system for each bearer service between the sending side and the receiving side. Thus, for example, in a send delay adding part 51a, it is impossible to delay a bearer frame a-5, which follows a bearer frame a-4 which has a delay A, by a delay C smaller than A. The same holds true for a receive delay adding part 56a. Thus, two kinds and two systems of delay allocation may be set for each bearer service. The operation of bearer operation of this case will be described with reference to FIG. 8.

Figure 8:
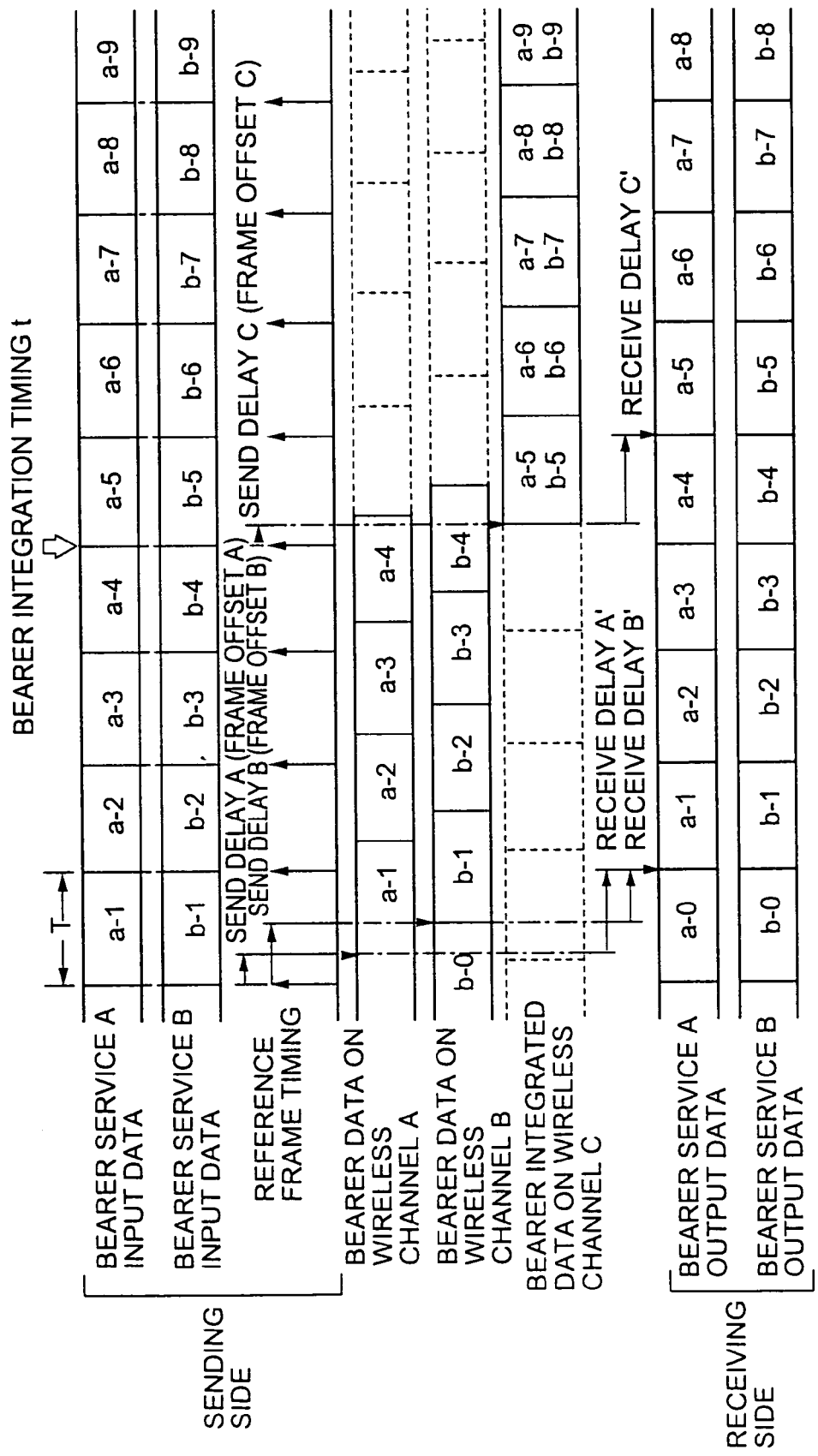
FIG. 8 is a timing chart for explaining the principle of the present invention.

As shown in FIG. 8, in the sending side, bearer frames a-1~a-4 and b-1~b-4 which are input before bearer integration are delayed by first send delays A and B(>A) respectively in a system. Then, they are sent by wireless channels A and B. In addition, bearer frames a-5~a-8 and b-5~b-8 which are input after bearer integration are delayed by second send delay C(<A, B) respectively in a different system. Then, they are bearer integrated and sent by a wireless channel C.

In the receiving side, the bearer frames a-1~a-4 and b-1~b-4 which are received via the wireless channel A and B before bearer integration are delayed by first receive delays A' (=T−A) and B' (=T−B) respectively, and output. In addition, the bearer frames a-5~a-8 and b-5~b-8 which are received after bearer integration via the wireless channel C are demultiplexed and are delayed by a second receive delay C' (=T−C), synthesized and output to bearer outputs A and B.

In regard to continuity of output data in the receiving side, output of the bearer frames a-1~a-4 and b-1~b-4 is completed by one frame period from the bearer integration timing t. In addition, the bearer frames a-5~a-8 and b-5~b-8 which are input after bearer integration timing t are output continuously after one frame period from the bearer integration timing t. Therefore, according to the above-mentioned invention described with reference to FIG. 8, regardless of the size of frame offsets A, B, C, one or more bearer service having any delay allocation can be integrated without instantaneous interruption into a bearer service having any delay allocation of C(0≦C≦T) and C' (=T−C).

In addition, the above object of the present invention is achieved by a bearer integration method for integrating a plurality of bearer services into a wireless channel by performing time-division multiplexing/demultiplexing, the bearer integration method comprising the steps of: inputting bearer service data in synchronization with reference frame timing of a period T in a sending side; delaying the bearer service data by two frame period by allocating delays A (0≦A≦T) and A' (=2T−A) between the sending side and a receiving side; outputting the bearer service data in the receiving side; and integrating the bearer service data into a wireless channel in which delays T+B (0≦B≦T) and B' (=T−B) are allocated between the sending side and the receiving side.

This invention is based on the premise that delay allocation of one kind and one system is available for each bearer service between the sending side and the receiving side. In this configuration, if total delay is one frame period T, a bearer service A can not be integrated into a wireless channel having a frame offset B which is shorter than that of the bearer service A. Thus, according to the above-mentioned invention, the total delay is 2T and one frame period T is always added to send delay B for bearer integration. Accordingly, since the frame offset B becomes T+B regardless of whether the frame offset A takes any value of 0~T, the frame offset B is always larger than the frame offset A. Therefore, bearer services of any frame offset A (0≦A≦T) can be a bearer service of any frame offset B (0≦B≦T).

In the above-mentioned invention, bearer services in which each bearer service has different delay allocation such as A (0≦A≦T), A' (=2T−A) and B (0≦B≦T), B' (=2T−B) can be integrated into a wireless channel C in which delays T+C (0≦C≦T) and C' (=T−C) are allocated.

Figure 16:
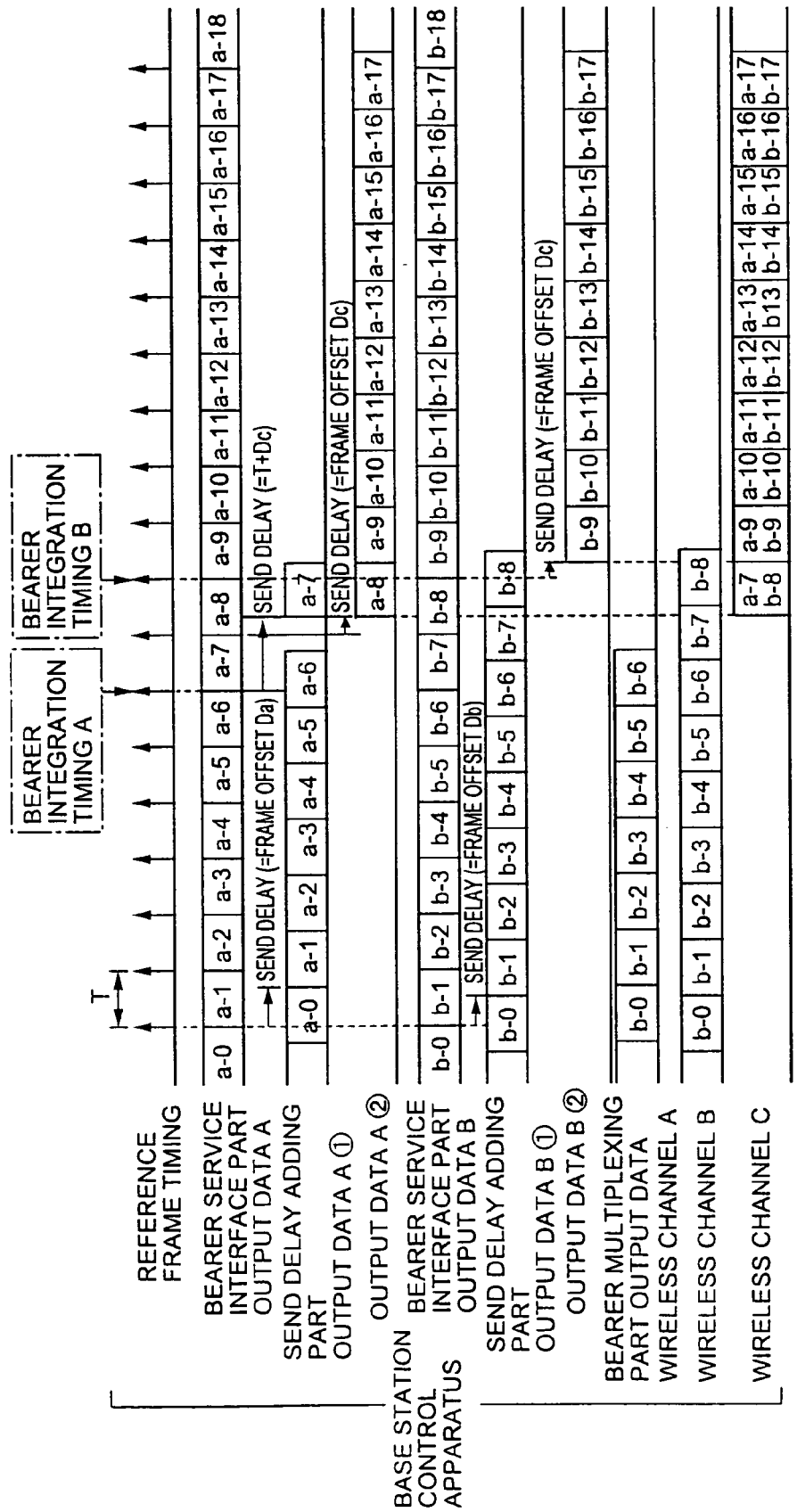
FIG. 16 shows a timing chart (A) for bearer integration control according to the third embodiment of the present invention.
Figure 17:
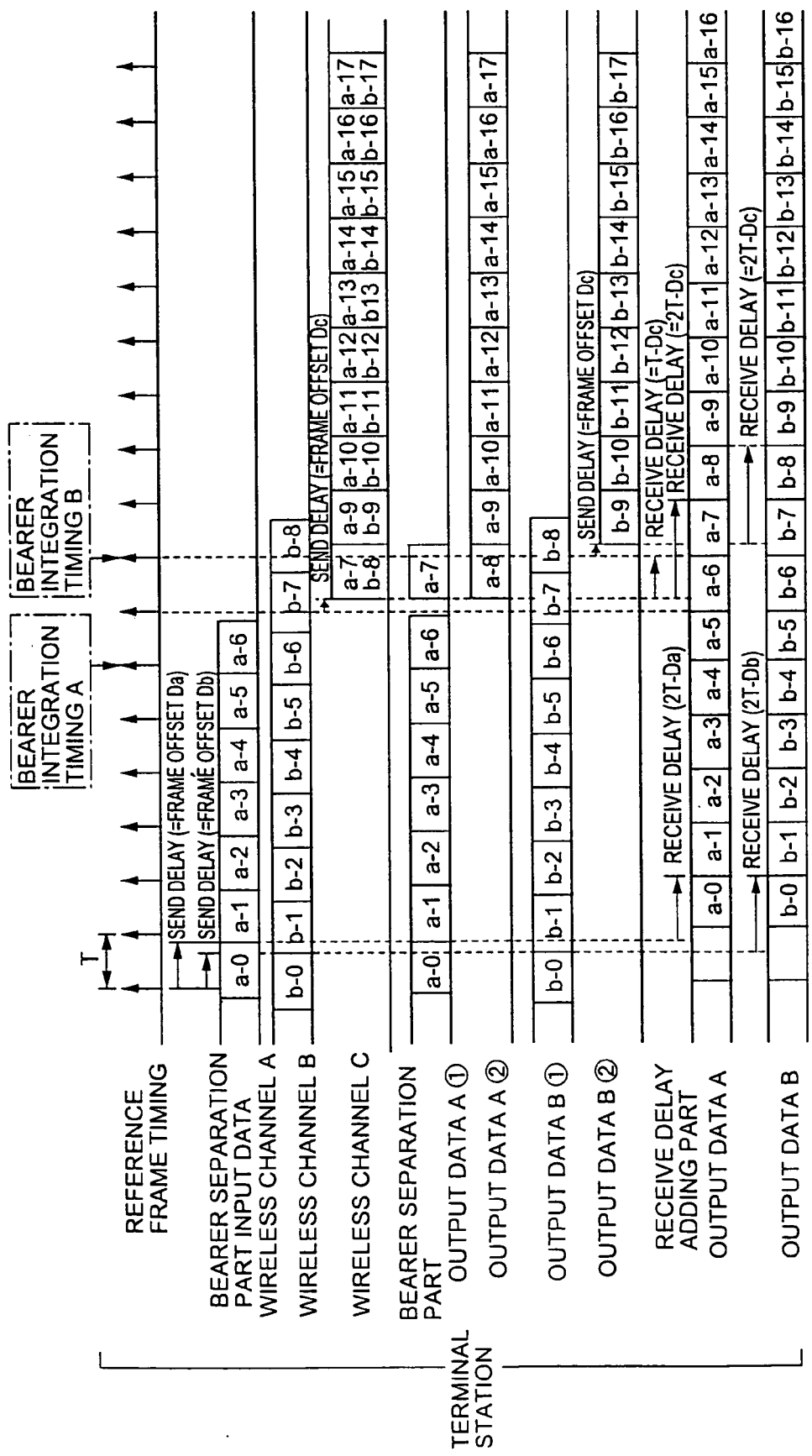
FIG. 17 shows a timing charts (B) for bearer integration control according to the third embodiment of the present invention.

In addition, as shown in FIG. 16 and FIG. 17, two kinds and two systems of delay allocation may be set for each bearer service.

When bearer services in which each bearer service has different delay allocation of Da (0≦Da≦T), Da' (=2T-Da) and Db (0≦Db≦T), Db' (=2T-Db) is integrated into a wireless channel C in which delays T+Dc (0≦Dc≦T) and Dc' (=T−Dc) are allocated, the first bearer frame a-7 which is input after bearer integration timing A is delayed by a period T+Dc in the sending side, and bearer frames a-8~a-17 after the second bearer frame are delayed by the period Dc as for a bearer service A in the bearer services. In addition, in the sending side, bearer frames b-9~b-17 after the third bearer frame which is input after bearer integration timing A are delayed by a period Dc as for another bearer service B in the bearer services. Then, bearer services A and B are integrated into the wireless channel C and sent.

In the receiving side, the first bearer frame a-7 is delayed by a period T-Dc, and the bearer frames a-8~a-17 after the second bearer frame are delayed by a period 2T-Dc, and output. In addition, in the receiving side, the bearer frames b-9~b-17 after the third bearer frame are delayed by a period 2T-Dc and output.

According to the above-mentioned invention, two kinds and two systems of delay allocation can be set for each bearer service and bearer integration data can be thrust forward. Therefore, substantial delay of transmission signal can be suppressed low.

In the above-mentioned bearer integration method, a point of delay allocation between the sending side and the receiving side may correspond to frame offset timing of a system. Accordingly, this method may be suitable for a CDMA system which defines frame offset timing of the system beforehand.

In addition, the above object of the present invention is achieved by a bearer integration method comprising the steps of: obtaining a delay margin DM which can be allocated between a sending side and a receiving side by subtracting a system delay from the maximum allowable delay defined by service quality, when DM 2T in which T is a reference frame period, performing a bearer integration method of using delay 2T; when T DM<2T, performing a bearer integration method using delay T; and when DM<T, performing a bearer integration method using no delay. According to this invention, each bearer integration method of delay 0, T, 2T can be used effectively while satisfying necessary service quality. The bearer integration method to be performed may be determined by checking conditions in order of DM=≧2T, T≦DM<2T, DM<T.

The larger the delay margin DM is, the larger the possibility of being able to perform bearer integration is in a bearer integration method which can be selected. Thus, by checking conditions in order of DM≧2T, T≦DM<2T, DM<T, faster bearer integration becomes possible.

In the above-mentioned bearer integration method, a bearer integration method used before may be stored, and a bearer integration method to be used next can be determined according to the bearer integration method which is stored.

When a new bearer service is integrated for the same terminal station, there are many services which requires that differences between delays of a plurality of bearer services should be almost 0. In this case, a bearer integration method to be used next can be determined according to the bearer integration method which is stored, in which the bearer integration method to be used next may be the same as the bearer integration method which is stored. Accordingly, necessary bearer integration method can be selected effectively. In bearer integration methods each of which bearer integration method corresponds to DM 2T, T DM≦2T, or DM<T, when a bearer service is integrated into a bearer service having the same frame offset, the delay deference between a plurality of bearer services can be almost 0.

In the above-mentioned bearer integration method, when a delay margin of a bearer service to be integrated is smaller than a delay due to the bearer integration method which is stored, a bearer integration method which has a delay suitable for the delay margin of the bearer service to be integrated may be selected.

In addition, the above object of the present invention is achieved by a communication apparatus as shown in FIG. 6 in a wireless communication system which integrates a plurality of bearer services into a wireless channel by performing time-division multiplexing/demultiplexing, the communication apparatus including: a send delay adding part 51 which synchronizes with reference frame timing, delays one or more bearer service data input before bearer integration timing up to each frame offset timing, and delays a plurality of bearer service data input after bearer integration timing up to frame offset timing of bearer integration; and a bearer data multiplexing part 52 which time-division multiplexes a plurality of bearer service data output from the send delay adding part 51. This apparatus can be realized as a base station control apparatus, a mobile station apparatus and the like in a CDMA mobile communication system.

Further, the above object of the present invention is achieved by a communication apparatus as shown in FIG. 6 comprising: a bearer data separation part 55 which time-division demultiplexing data of bearer integration received via a wireless channel; and a receive delay adding part 56 which delays one or more bearer service data input before bearer integration timing up to reference frame timing, and delays each bearer service data output from the bearer data separation part after bearer integration timing up to frame offset timing. This apparatus can be realized as a base station control apparatus, a mobile station apparatus and the like in a CDMA mobile communication system.

In the following, the configuration shown in FIG. 6 will be described. FIG. 6 shows a configuration for understanding the present invention easily, and this figure is does not limit the scope of the present invention. In addition, FIG. 6 shows a case in which one kind and one system of delay allocation is available for each bearer service between the sending side and the receiving side.

In FIG. 6, each of 51a and 51b indicates a send delay adding part which stores input data of bearer services A, B according to send delays (frame offsets) A, B specified from reference frame timing and outputs, 52 indicates a bearer data multiplexing part which outputs bearer data A and B without multiplexing when bearer integration indication=OFF and which outputs bearer data A and B after multiplexing when bearer integration indication=ON, 53 indicates a wireless channel send part (CDMA) which sends a wireless channel by the code division multiple access (CDMA) method.

In addition, 54 indicates a wireless channel receive part (CDMA) which demodulates a CDMA wireless channel and receives bearer data of each transmission rate, 55 indicates a bearer data separation part which separates bearer data integrated in the bearer data multiplexing part 52 and outputs unintegrated bearer data as it is, each of 55a and 56b indicates a receive delay adding part which stores bearer services A and B according to a receive delay specified by frame offsets (that is, a period from the frame offset to the reference frame timing) and outputs the data of the bearer services A and B.

Bearer integration timing is predetermined between the sending part and the receiving part. When it becomes the bearer integration timing, a common send delay C is set in each of the send delay adding part 51a and 51b. The send delay C is applied to data sent after that. A receive delay C' is set at the first frame offset A from the bearer integration timing in the receive delay adding part 56a, and the receive delay C' is set at the first frame offset B from the bearer integration timing in the receive delay adding part 56b. The receive delay C' is applied to data received after that. In the configuration, delay from the input of the send delay adding part 51 to the output of the receive delay adding part 56 is set to be a reference frame length T. In addition, in the combination of send delay and receive delay, only frame offsets are changed on a wireless channel. Therefore, a time gap which occurs due to time difference of different frame offsets can be absorbed between wireless channels of different frame offsets. Thus, bearer integration without instantaneous interruption can be realized.

The detailed description of the preferred embodiments of the present invention will be provided in the following.

Figure 2:
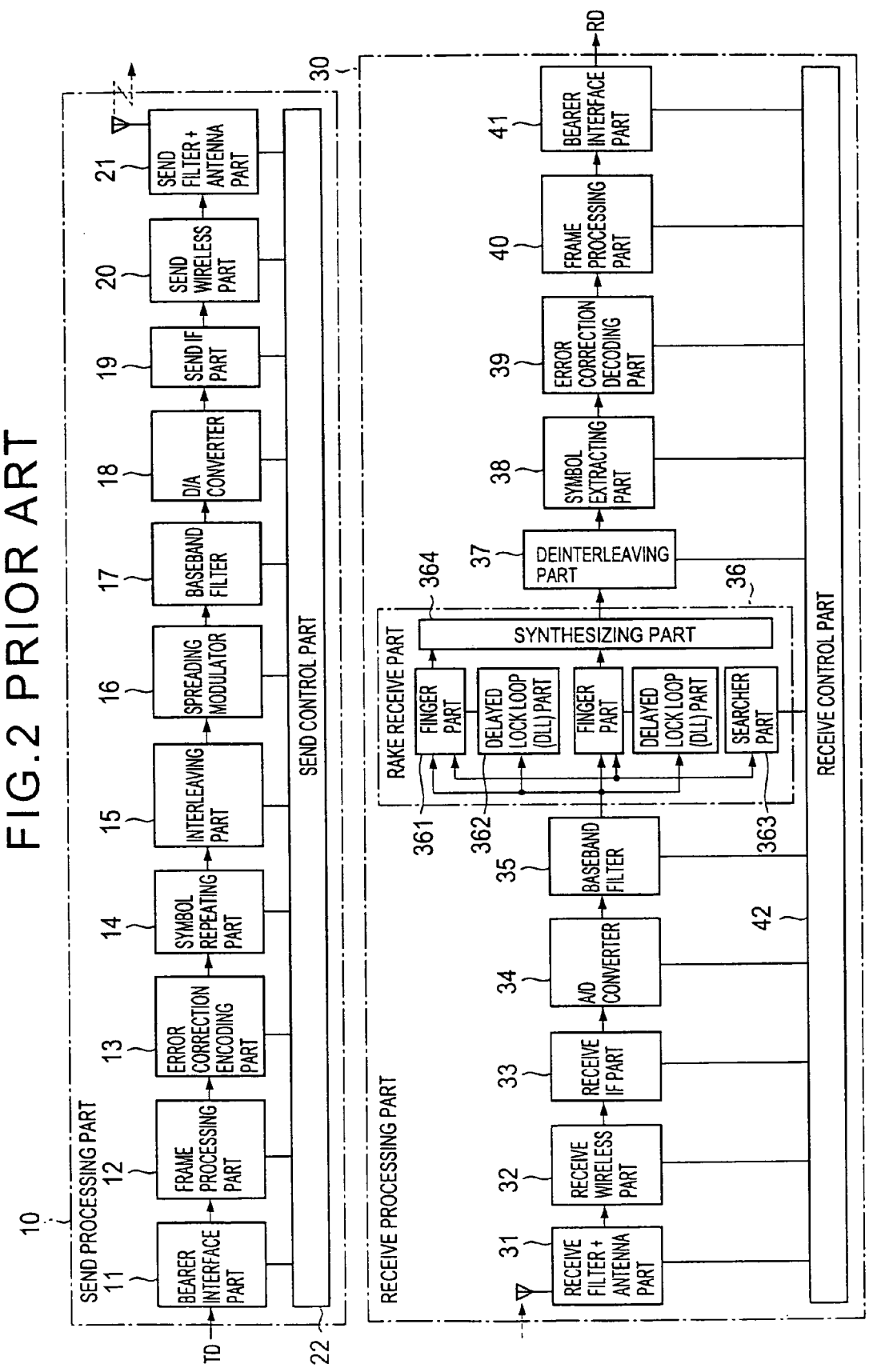
FIG. 2 shows a basic configuration of a send/receive processing part (which does not support bearer integration) in the mobile station 1.
Figure 3:
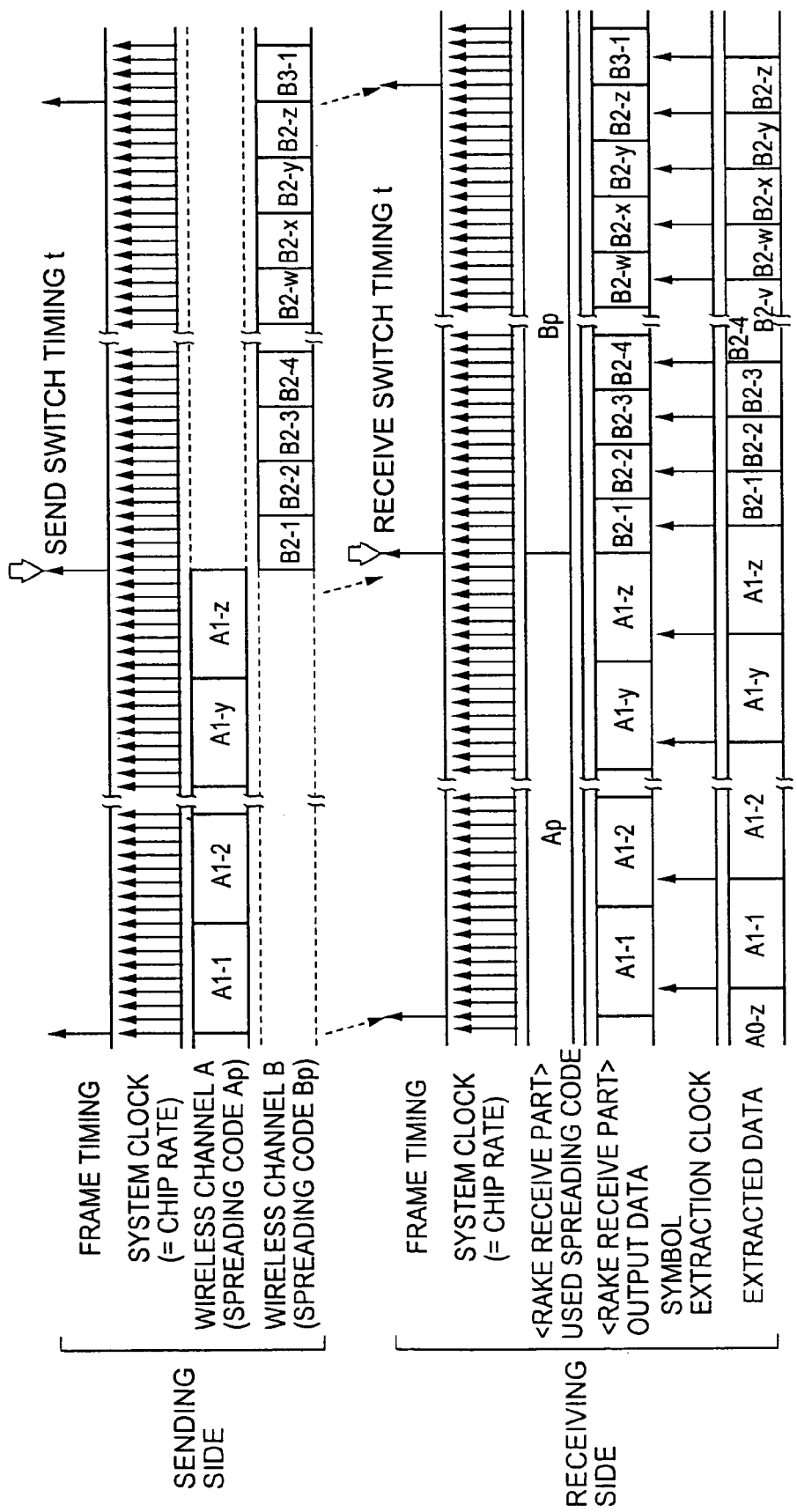
FIG. 3 is a timing chart showing communication switching to a wireless channel of a different data transmission rate.
Figure 4:
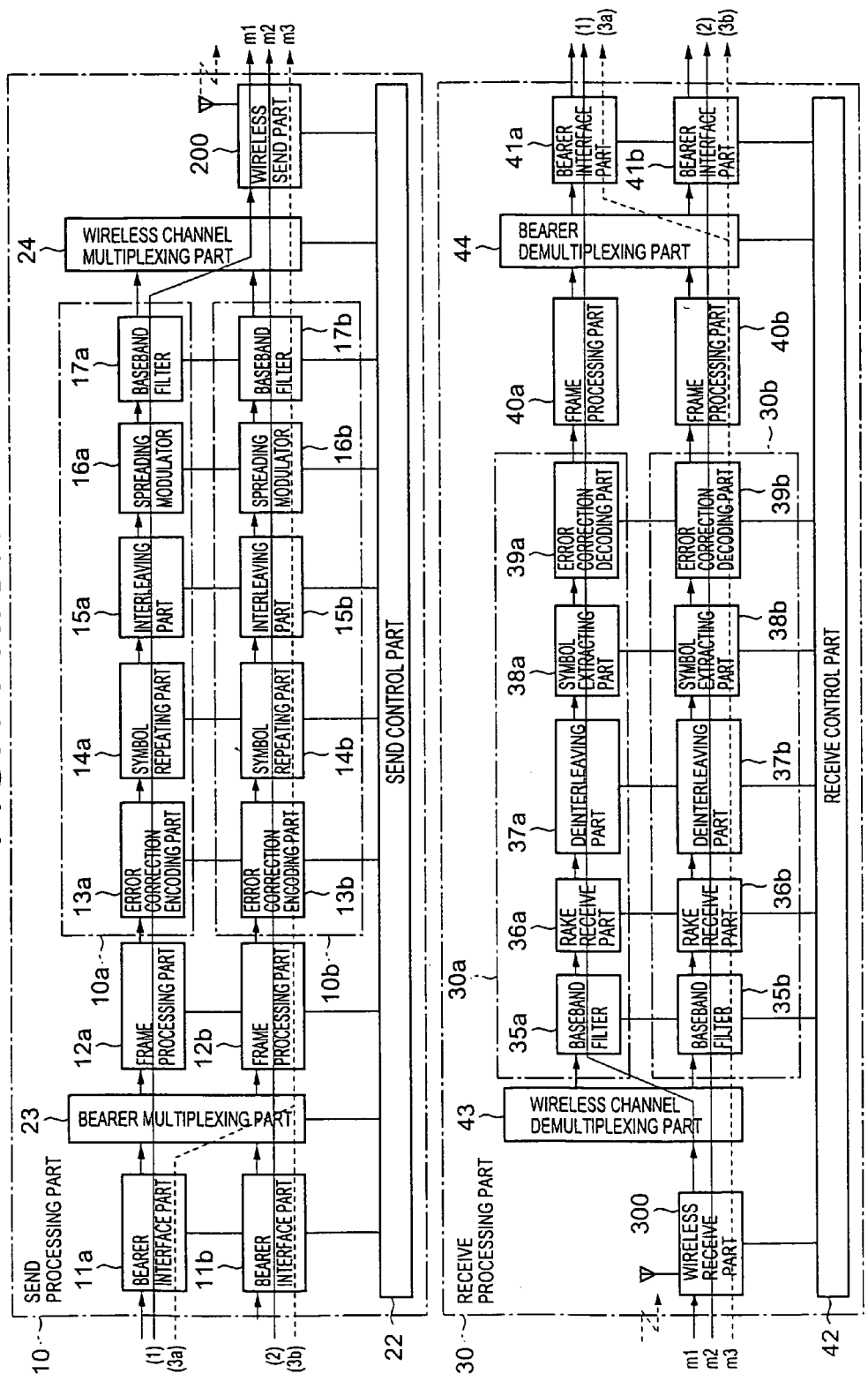
FIG. 4 shows a basic configuration of send/receive processing parts (which support bearer integration) of the mobile station 1 according to a conventional technique.
Figure 5:
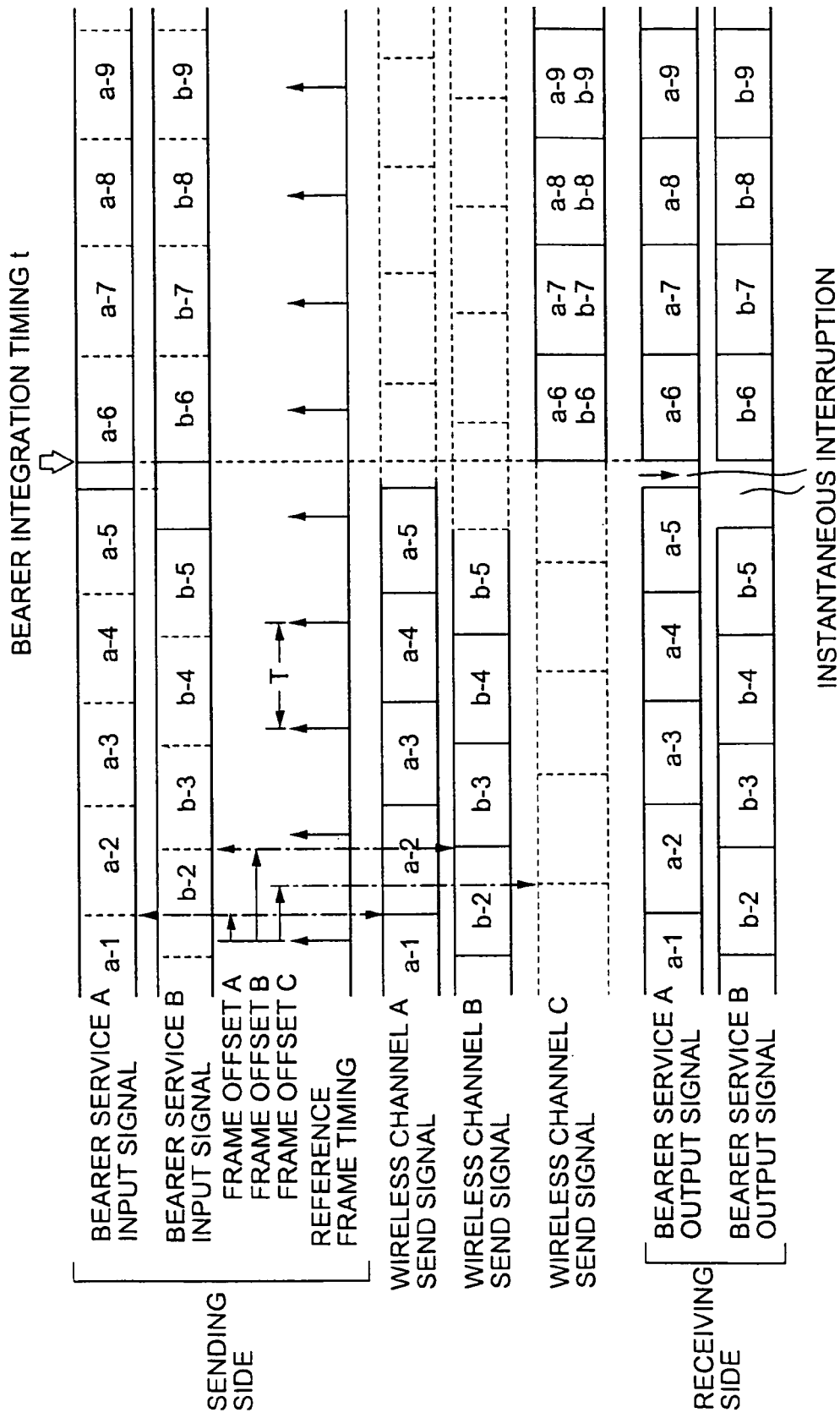
FIG. 5 shows a timing chart for performing bearer integration between wireless channels of different frame offsets according to the conventional technique.
Figure 9:
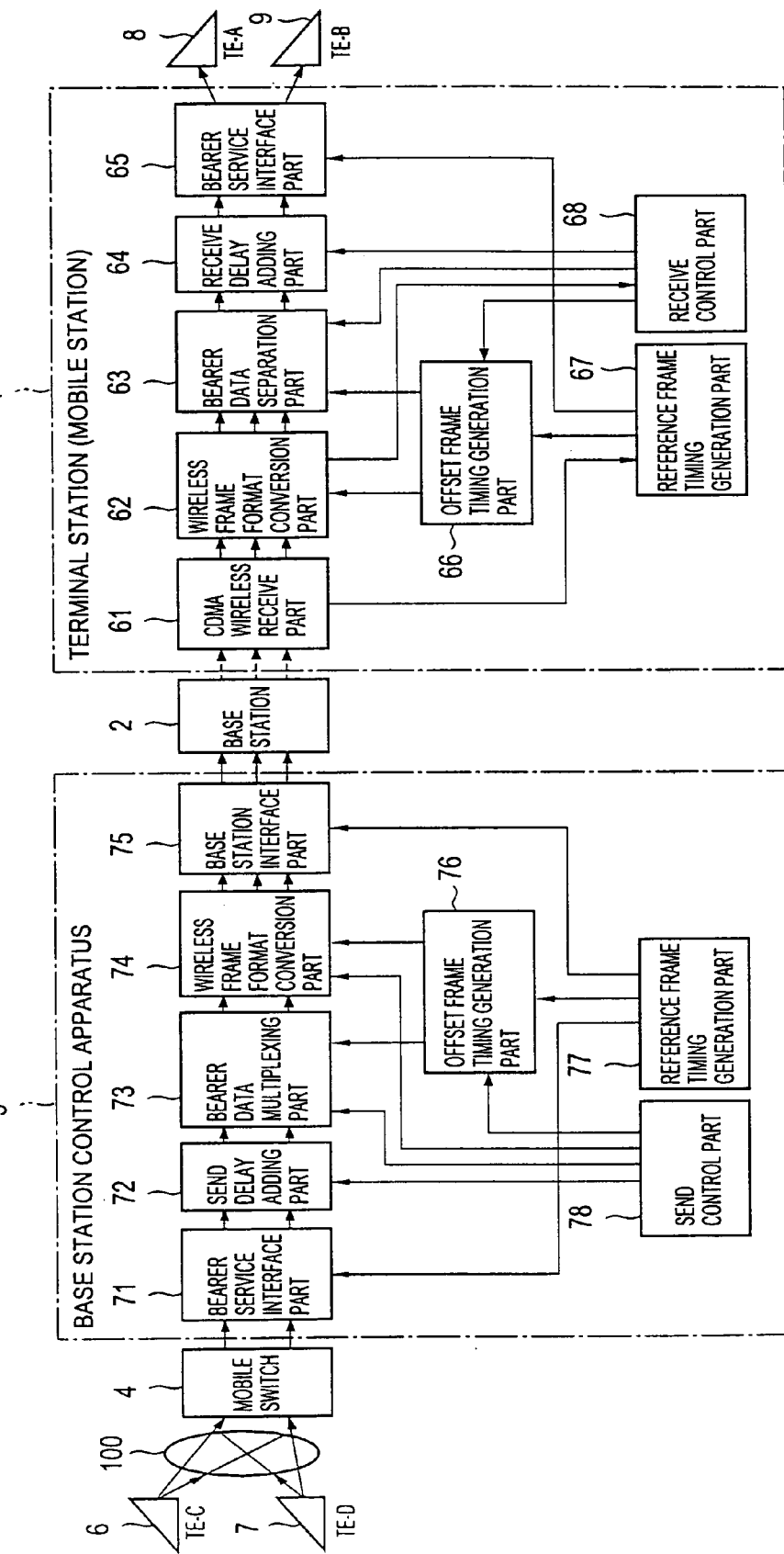
FIG. 9 shows a block diagram of a part of a mobile communication system according to a first embodiment of the present invention.

FIG. 9 shows a block diagram of a part of a mobile communication system according to a first embodiment of the present invention. According to the configuration shown in FIG. 9, control of delay allocation of one frame period T in total is shared between the sending side and the receiving side. In addition, this figure shows a case in which bearer integration is possible from bearer services having a small frame offset to a bearer service having the same or a larger frame offset. The whole configuration of the mobile communication system may be the same as that shown in FIG. 1. In FIG. 9, the part (route) relating to bearer integration control is arranged such that it is easy to understand. The techniques described with reference to FIGS. 2 and 4 can be used for detailed configurations for each part.

In FIG. 9, the numeral 3 indicates a base station control apparatus according to the first embodiment of the present invention, 71 indicates a bearer service interface part, 72 indicates a send delay adding part which delays bearer service data captured in synchronization with the reference frame timing by a predetermined frame offset and outputs the delayed data, 73 indicates a bearer data multiplexing part which time-division multiplexes a plurality of bearer data according to a bearer integration request, 74 indicates a wireless frame format conversion part which converts multiplexed/not-multiplexed data output by the bearer data multiplexing part 73 into a wireless frame format of a corresponding transmission rate, 75 indicates a base station interface part, 76 indicates an offset frame timing generation part which generates offset frame timing of the frame offset determined by the reference frame timing, 77 indicates a reference frame timing generation part and 78 shows a send control part which performs resource management of wireless channels (such as designation of a wireless channel and a frame offset for use) and provides the bearer integration timing.

In addition, 1 indicates a terminal station (a mobile station) according to the first embodiment, 61 indicates a CDMA wireless receive part, 62 indicates a wireless frame format conversion part which extracts bearer data from a wireless frame format, 63 indicates a bearer data separation part which separates time-division multiplexed bearer data for each bearer service, 64 indicates a receive delay adding part which delays bearer service data received with a predetermined frame offset to the reference frame timing and outputs the delayed data, 65 indicates a bearer service interface part, 66 indicates an offset frame timing generation part which generates offset frame timing of the frame offset determined by the reference frame timing, 67 indicates a reference frame timing generation part which generates reference frame timing from the frame timing extracted by the CDMA wireless receive part 61, 68 indicates receive control part which provide instructions of wireless channels, frame offsets and bearer integration timing to be used in the terminal station 1 according to notification from the send control part 78 of the base station control apparatus 3.

Figure 10:
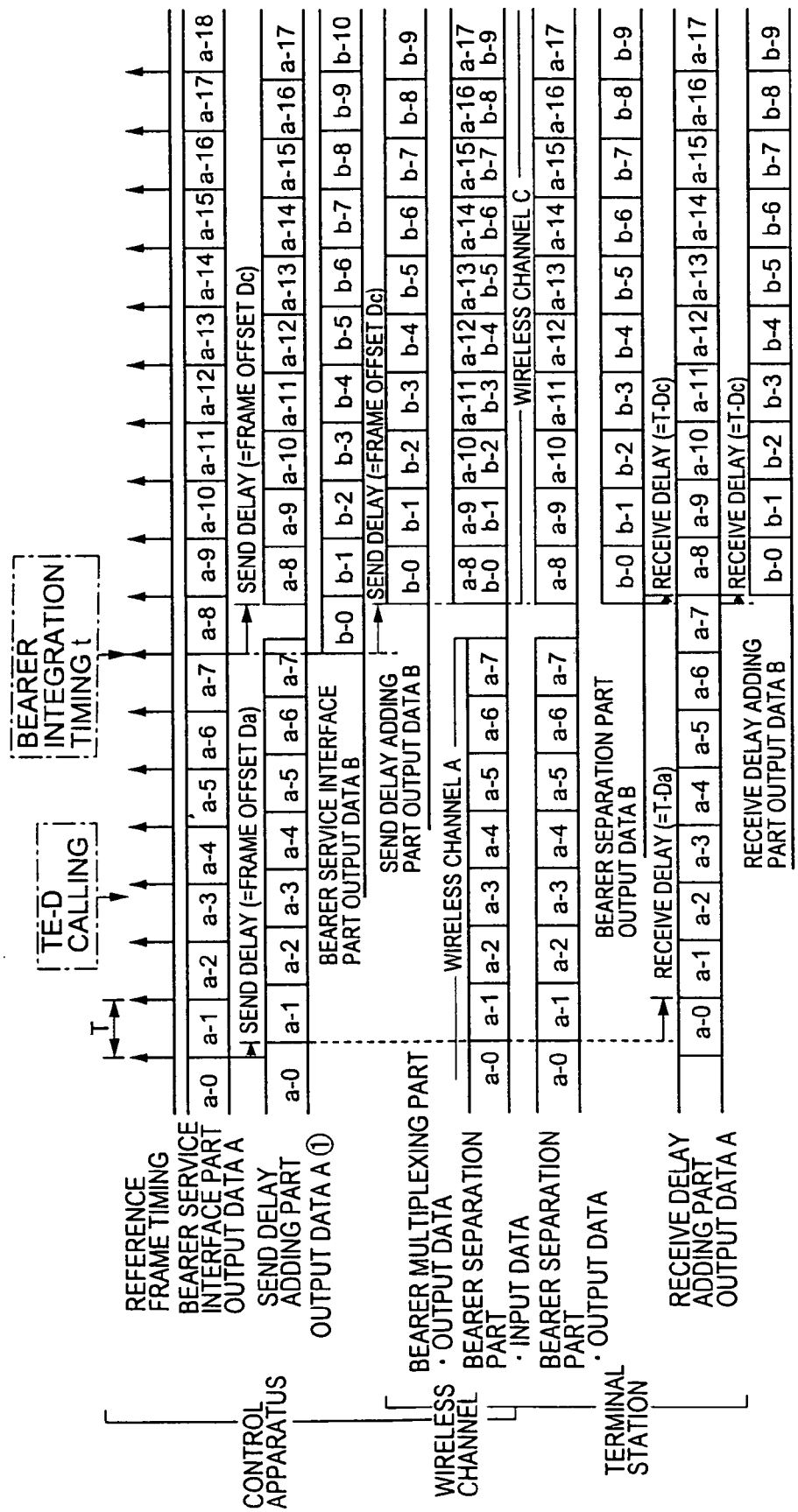
FIG. 10 is a timing chart of bearer integration control according to the first embodiment.

FIG. 10 is a timing chart of the bearer integration control according to the first embodiment. This timing chart shows a case in which a bearer service B relating to a new call is received, and the bearer service B is bearer integrated with a bearer service A in communication and the bearer services are continued on the wireless channel C without instantaneous interruption. In this figure, transmission delay in a wireless channel, process delay in each devices and the like are not included.

In FIG. 10, TE-C and TE-A perform communication of the bearer service A (transmission rate Sa) via the wireless channel A (frame offset Da). At this time, the sum of the delay time of the send delay adding part 72 and the receive delay adding part 64 is regarded as one wireless frame period T (for example 20 ms). Accordingly, the bearer frame a-1 captured to the base station control apparatus 3 in synchronization with a reference frame timing is sent to the wireless channel A after being delayed by time Da. Then, the bearer frame a-1 is received by the terminal station 1. The terminal station 1 further delays the received bearer frame a-1 by time Da' (=T-Da) and outputs the delayed bearer frame a-1. Therefore, the bearer frame a-1 which is input to the sending side in synchronization with a reference frame timing is output to the receiving side after delayed by the one frame period T in total.

When there is a call for the bearer service B (transmission rate Sb) from TE-D to TE-B in this state, the send control part 78 in the base station control apparatus 3 which receives the call regards the call as a call to the same terminal station 1. In addition, the send control part 78 searches unused wireless channels for a wireless channel which can accommodate two channels (transmission rate=Sa+Sb) and which has the frame offset equal to or larger than Da. When there is a wireless channel C which satisfies the condition (frame offset Dc≧Da), the send control part 78 captures the wireless channel C and call TE-B of the terminal station 1. After a while, when there is a reply from TE-B, bearer integration timing is determined by the send control part 78 and the receive control part 68, and then, each block in each apparatus is notified of bearer integration timing=t, wireless channel=C, frame offset=Dc, and transmission rate=Sc (=Sa+Sb).

The send delay adding part 72 delays input data which is before bearer integration timing t (before bearer frame a-7) by frame offset=Da and delays input data after the bearer integration timing t (after bearer frame a-8) by frame offset Dc (≧Da), and outputs the data to the bearer data multiplexing part 73. Accordingly, a time gap (Dc-Da) appears between the bearer frames a-7 and a-8 before and after the bearer integration timing t in the sending side. In addition, from this bearer integration timing t, a bearer frame b-0 relating to the bearer service B is input. As in the case of the above-mentioned bearer service A, the send delay adding part 72 delays the bearer frames b-0 and the like by frame offset=Dc and outputs the delayed data to the bearer data multiplexing part 73.

The bearer data multiplexing part 73 time-division multiplexes data of the bearer services A and B (transmission rate Sc=Sa+Sb) which is input with the above-mentioned same frame offset timing Dc after the bearer integration timing t. In addition, the wireless frame format conversion part 74 converts the multiplexed data into a wireless frame format in accordance with the transmission rate Sc. The wireless frame format conversion part 74 has wireless frame formats corresponding to each transmission rate. By using the wireless frame format, header information or the like which is common to the bearer services A, B and which may become redundant can be eliminated. Then, bearer integrated data is sent by the wireless channel C by the base station 2.

In terminal station 1, the bearer integrated data of the wireless channel C is received after being delayed by the frame offset Dc from the bearer integration timing t. The bearer data separation part 63 receives the format converted bearer integrated data and demultiplexes the data into each bearer data of the bearer services A and B. The receive delay adding part 64 delays separated bearer data A and B further by Dc' (=T-Dc) and outputs the data. Thus, the bearer frames a-8, b-0 which were input at the bearer integration timing t from the sending side are delayed by 1 frame period T in total and output.

In regard to continuity of output data in receiving side, the bearer frames from a-1 to a-7 are output by 1 frame period after the bearer integration timing t. After that, a series of bearer integrated bearer frames from the bearer frame a-8, b-0 is output. Accordingly, even when the bearer service A is integrated to the wireless channel C of the different frame offset C by being bearer integrated with the bearer service B, the receiving side can continue communication without instantaneous interruption only by changing delay allocation between the sending side and the receiving side.

When the unused wireless channel C (which can accommodate the two channels of the bearer services A and B and has a frame offset equal to or larger than Da) can not be captured, a wireless channel which can accommodate the single bearer service B and, if possible, has a frame offset which is equal to or smaller than Da is searched for. When there is a wireless channel B which satisfies the condition (frame offset=Db≦Da), the wireless channel B is reserved (captured) and TE-B of the terminal station 1 is called. After a while, when TE-B replies, communication of the bearer service B is started over the wireless channel B. At this time, delay allocation for the bearer service B between the sending side and the receiving side is Db (≦Da) and Db' (=T-Db). After that, the apparatus continues to search for an unused wireless channel which can accommodate both of the bearer services A, B and has a frame offset equal to or larger than Da. When the wireless channel C which satisfies the condition is found, the same processing is performed to the bearer service B in the same way as that for the above-mentioned bearer service A such that the bearer services A and B are integrated into the wireless channel C.

When there is no unused wireless channel which can accommodate the two channels of the bearer services A, B and has a frame offset equal to or larger than Da, and, there is no wireless channel which can accommodate the single bearer service B and has a frame offset equal to or larger than Da, communication for the single bearer service B is started by an unused wireless channel B (frame offset Db) which has a frame offset as close as possible to Da (which means Db can be larger than Da). At this time, the delay allocation for the bearer service B between the sending side and the receiving side is Db (≈Da), Db' (=T-Db).

While the bearer services A and B are transmitted by different wireless channels, the apparatus continues to search for an unused wireless channel which can accommodate both of the bearer services A and B and has a frame offset equal to or larger than Db. When such a wireless channel is found, the same processing is performed to the bearer service B in the same way as that for the above-mentioned bearer service A such that the bearer services A and B are integrated.

In the above description, acquisition condition for a wireless channel and a bearer integration method have been described. The acquisition method (resource management method and the like) of the wireless channel can be performed by an apparatus other than the base station control apparatus 3.

In addition, in the above-mentioned embodiment, a case in which delay allocation of one kind and one system is possible for each bearer service between the sending side and the receiving side. However, the apparatus can be configured such that two kinds and two systems of delay allocation for each bearer service can be controlled. This configuration is not shown in figures. The configuration for realizing this method can be obtained, for example, by configuring the send delay adding part 72, the bearer data multiplexing part 73, the bearer data separation part 63 and the receive delay adding part 64 shown in FIG. 9 in the same way as configuring a send delay adding part 72B, a bearer data multiplexing part 73B, a bearer data separation part 63B and the receive delay adding part 64B shown in FIG. 15 respectively. By configuring the first embodiment in this way, one or more bearer services of any delay allocation can be integrated into a bearer service of any other delay allocation.

The operation of this case will be described concretely with reference to FIG. 8. In the sending side, bearer frames a-1~a-4 and b-1~b-4 which are input before bearer integration are stored in first buffers (not shown in the figure) which are for each bearer service. In addition, each of a-1~a-4 and b-1~b-4 is delayed by first send delays A and B (>A) respectively. After that, they are read from the first buffers and sent by the wireless channels A and B. Bearer frames a-5~a-8 and b-5~b-8 which are input after bearer integration are stored in second buffers (not shown in the figure) which are for each bearer service. In addition, each of a-5~a-8 and b-5~b-8 is delayed by common second send delay C (<A, B). After that, they are read from the second buffers, bearer integrated and sent by the wireless channel C. At this time, since the send delay satisfies C<A, B, the following bearer frames a-5 and b-5 start to be read before the preceding bearer frames a-4 and b-4 are read completely. However, since the apparatus includes two systems (or two frames) of first and second buffers for the above-mentioned bearer services, the bearer frames can be read in synchronization with the timing in which they are partly duplicated.

In the receiving side, bearer frames a-1~a-4 and b-1~b-4 which are received via the wireless channels A and B before bearer integration are stored in first buffers (not shown in the figure) which are for each bearer service. In addition, each of a-1~a-4 and b-1~b-4 is delayed by first receive delay A' (=T−A) and B' (=T−B) respectively. After that, they are read from the first buffers and sent to bearer services A and B. In addition, bearer integrated frames a-5~a-8 and b-5~b-8 which are received via the wireless channel C after bearer integration are stored in second buffers (not shown in the figure) which are provided for each bearer service after bearer separation. In addition, each of a-5~a-8 and b-5~b-8 is delayed by common second receiving delay C' (=T−C) respectively. After that, they are read from the second buffers, synthesized and sent to bearer output A and B. At this time, since the send delay satisfies C<A, B, the following bearer frames a-5 and b-5 are received in which the bearer frames a-5 and b-5 are partly duplicated with the preceding bearer frames a-4 and b-4. However, since the apparatus includes two systems (or two frames) of first and second buffers for the above-mentioned bearer services, the bearer frames can be written in synchronization with timing in which they are partly duplicated.

In regard to continuity of output data in the receiving side, bearer frames a-1~a-4 and b-1~b-4 before bearer integration are output by one frame period after the bearer integration timing t. In addition, after one frame period after the bearer integration timing t, bearer frames a-5~a-8 and b-5~b-8 which are bearer integrated are output successively. Thus, according to the embodiment, regardless of sizes of the frame offsets A, B and C, one or more bearer services A, B and the like having any delay allocation can be integrated into a bearer service having another delay allocation C ($0 \leq C \leq T$), C' ($=T-C$) without instantaneous interruption.

Figure 11:
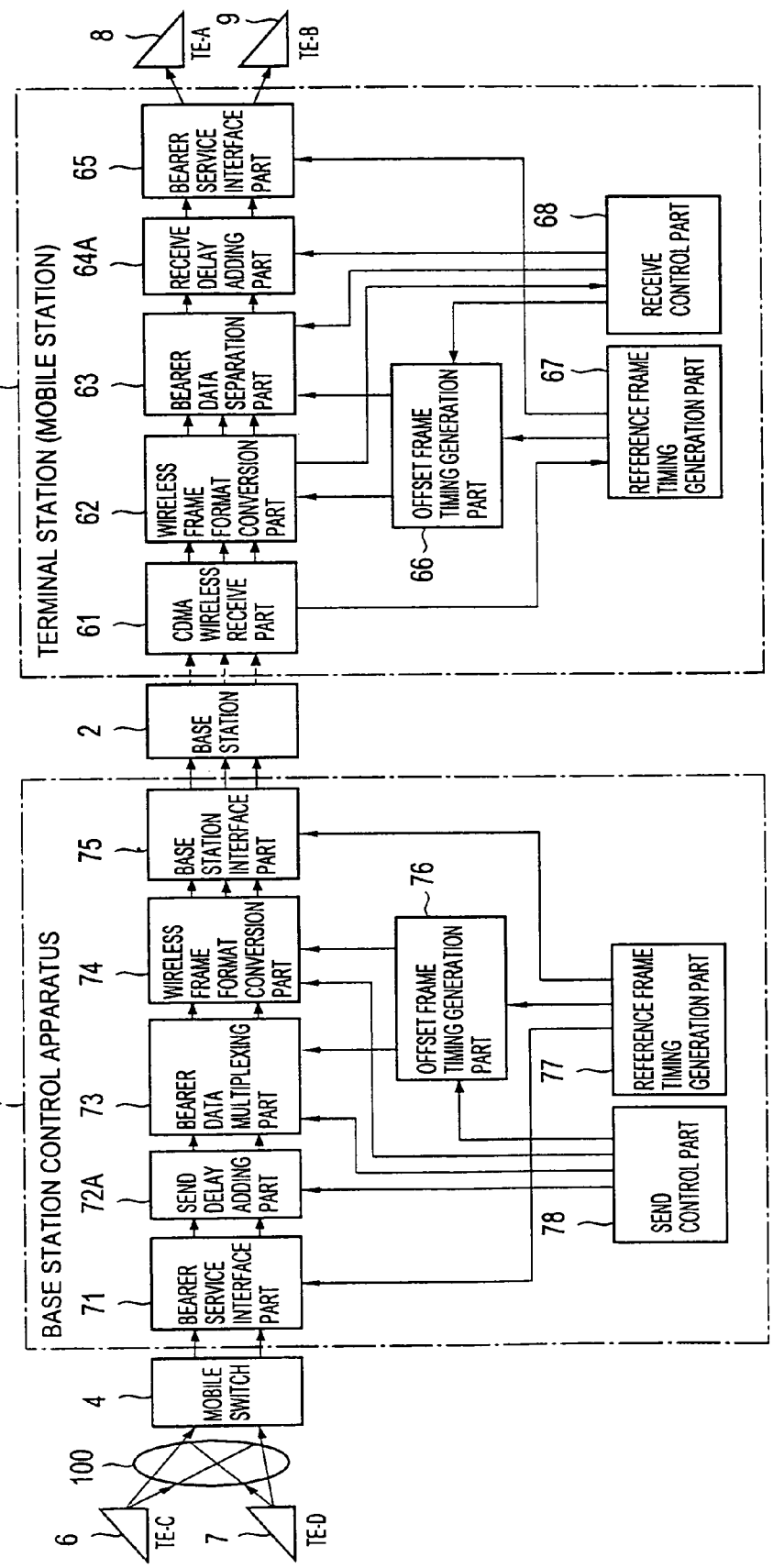
FIG. 11 shows a block diagram of a part of a mobile communication system according to a second embodiment of the present invention.

FIG. 11 shows a block diagram of a part of a mobile communication system according to a second embodiment of the present invention. According to the configuration shown in FIG. 11, control of delay allocation of 2 frame period 2T in total is shared between the sending side and the receiving side. In addition, according to the mobile communication system shown in FIG. 11, bearer services of any frame offset can be integrated into a bearer service of any frame offset. In FIG. 11, 72A indicates a send delay adding part which can delay bearer data which is before being multiplexed by within $0 \leq t \leq 2T$, and 64A indicates a receive delay adding part which can delay bearer data which is separated by within 0 t 2T. Other parts may be the same as those described with reference to FIG. 9.

Figure 12:
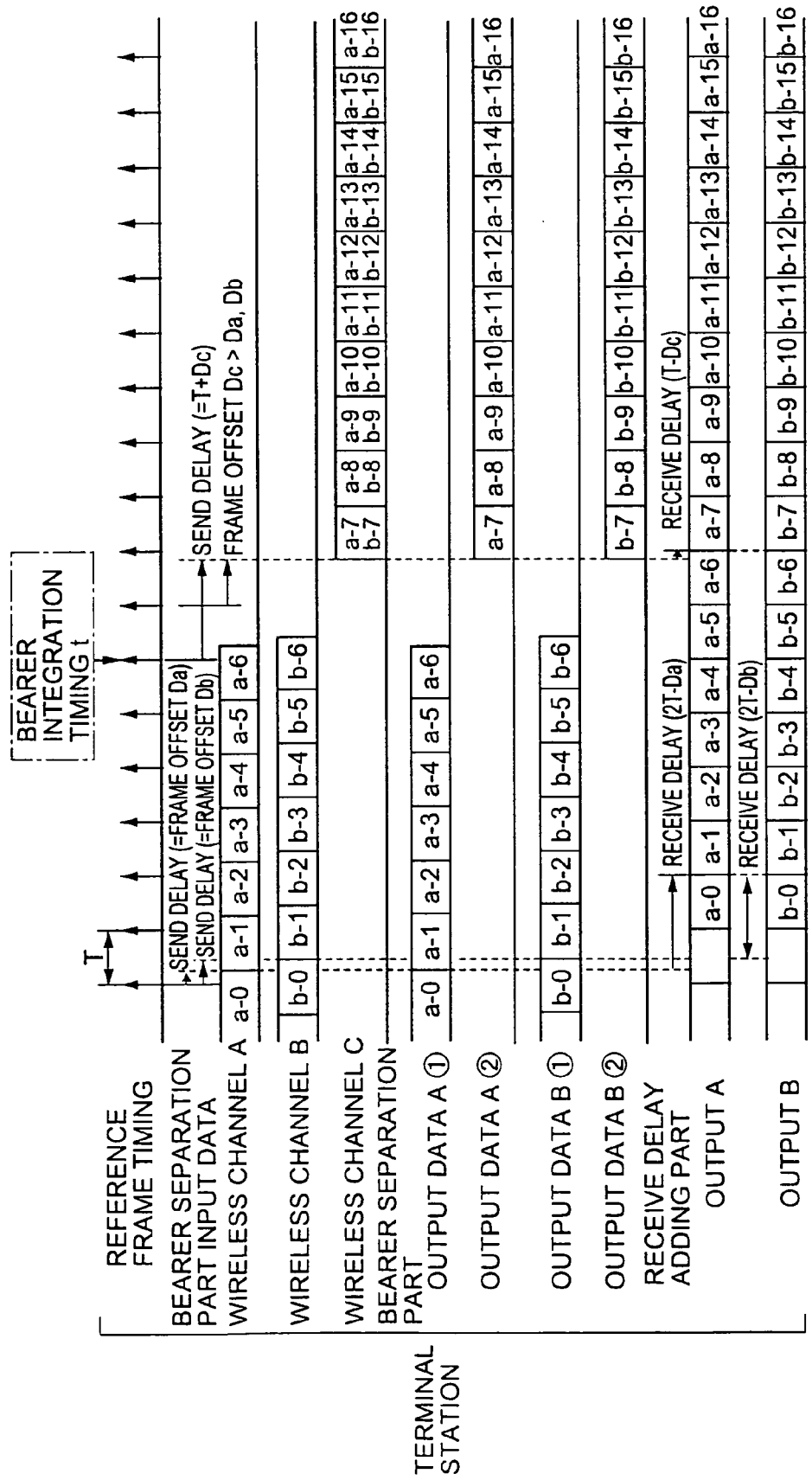
FIG. 12 shows a timing chart (1) of bearer integration control according to the second embodiment.

FIG. 12 shows a timing chart (1) of bearer integration control according to the second embodiment. The timing chart shows an example in which bearer services A, B which are in communication having frame offsets Da, Db (>Da) respectively are integrated into a bearer service of a frame offset Dc (>Db). Before bearer integration, bearer frames a-0~a-6 and b-0~b-6 are sent after being delayed by time Da and Db (>Da) respectively. In the receiving side, bearer frames a-0~a-6 and b-0~b-6 are output after being delayed by time Da' (=2T−Da) and Db' (=2T-Db) respectively. Therefore, the bearer frames a-0~a-6 and b-0~b-6 which were input in synchronization with the reference frame timing of the sending side are output from the receiving side after 2 frame period (2T) delay in total.

When it becomes bearer integration timing t, bearer frames a-7~a-17 and b-7~b-17 which are input after the above-mentioned bearer frames in synchronization with the reference frame timing of the sending side are bearer multiplexed after delayed by time T+Dc (Dc>Db) respectively and output. Therefore, also the bearer frames a-7~a-17 and b-7~b-17 which are input after the bearer integration timing t in the sending side are output from the receiving side after 2 frame period (2T) delay in total.

In regard to continuity of output data in the receiving side, the bearer frames from a-0 to a-6 and b-0~b-6 are output by 2 frame period after the bearer integration timing t. After that, bearer integrated bearer frames a-7~a-17 and b-7~b-17 are output continuously.

Figure 13:
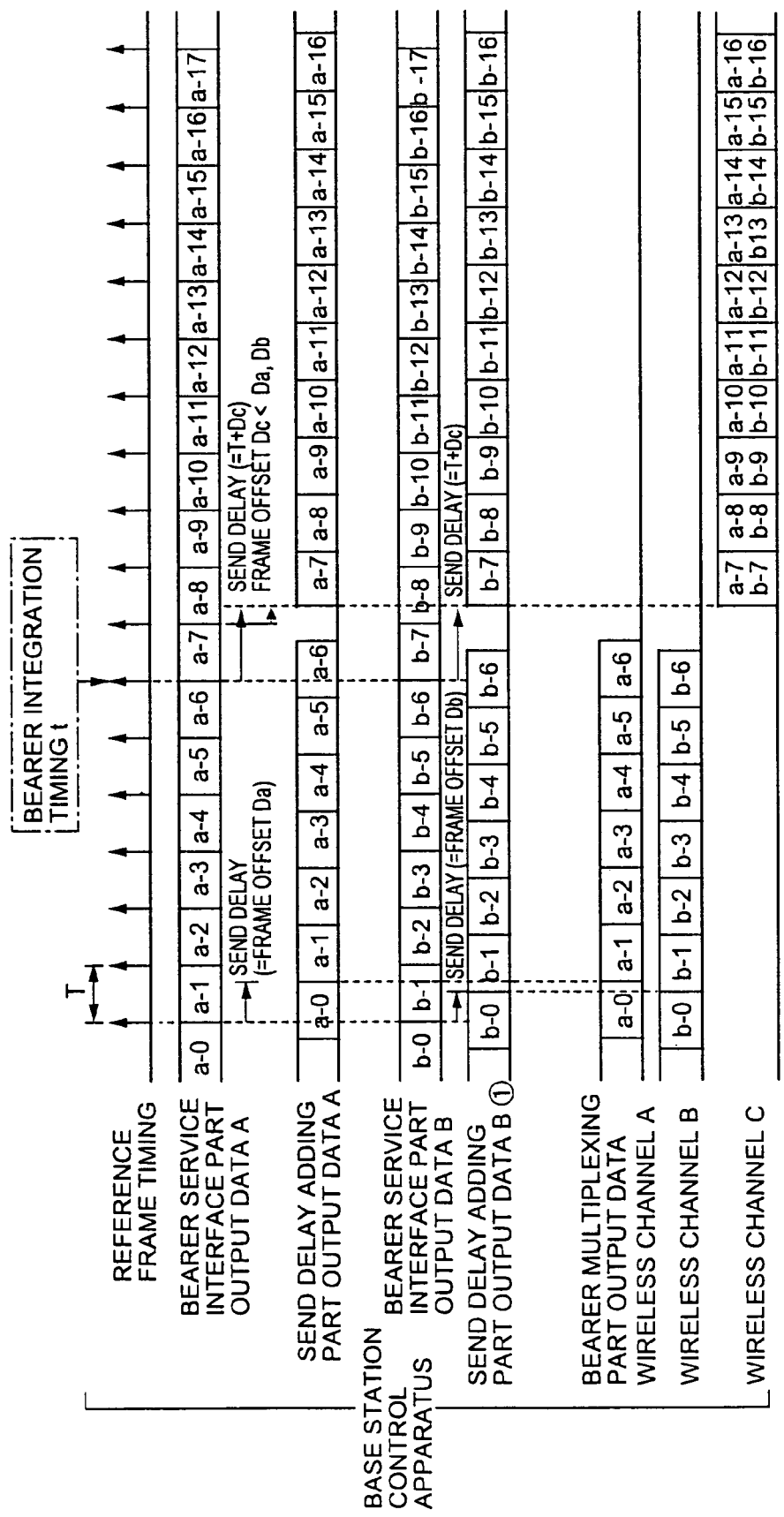
FIG. 13 shows a timing charts (2A) of the bearer integration control according to the second embodiment of the present invention.
Figure 14:
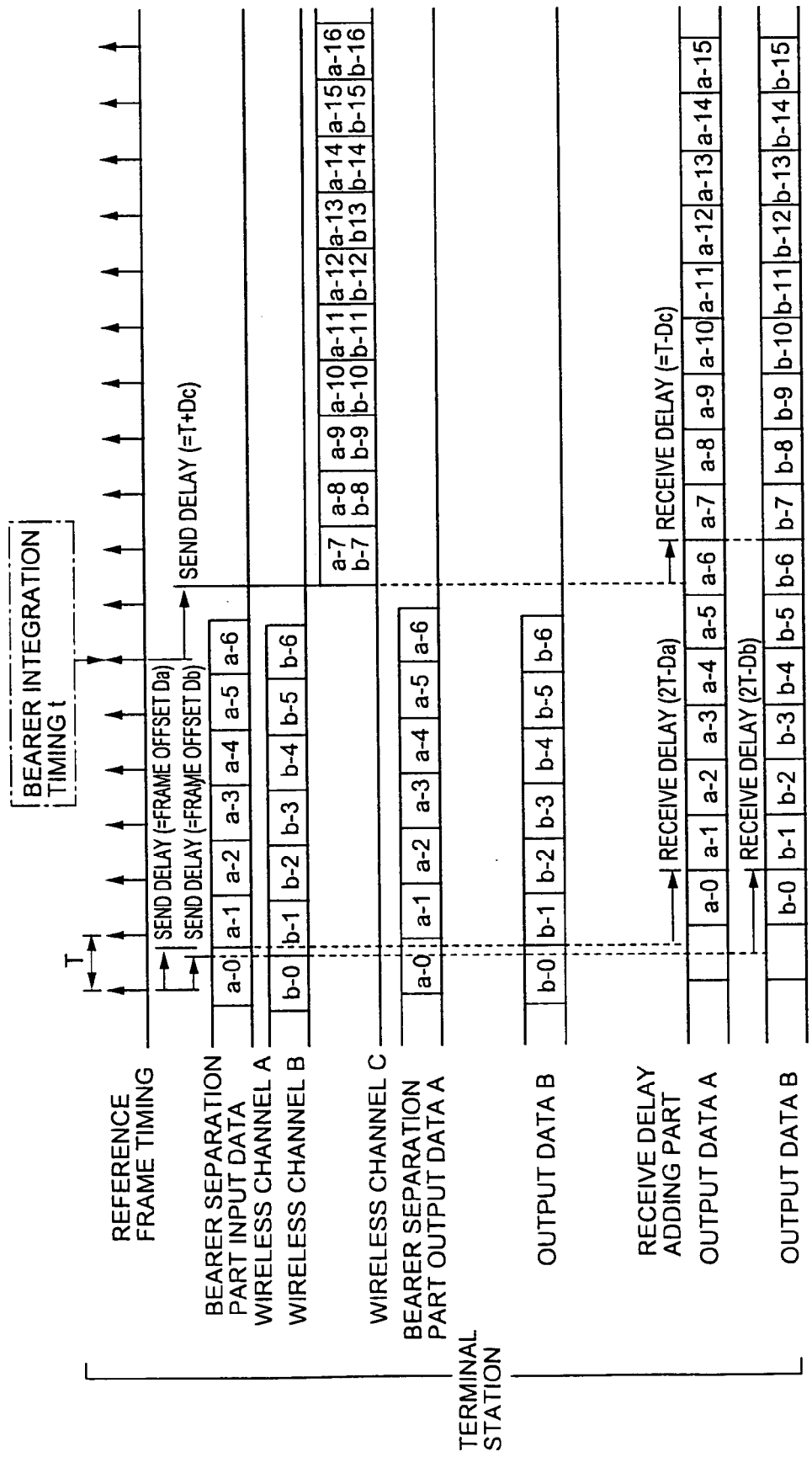
FIG. 14 shows a timing charts (2B) of the bearer integration control according to the second embodiment of the present invention.

FIG. 13 and FIG. 14 show timing charts (2A), (2B) of the bearer integration control according to the second embodiment of the present invention. FIG. 13 and FIG. 14 show an example in which bearer services A and B which are in communication having frame offsets Da and Db (<Da) respectively are integrated into a bearer service of a frame offset Dc(<Db). The operation before bearer integration is the same as that described with FIG. 12 except that, in the example shown in FIGS. 13 and 14, Da is larger than Db (Da>Db).

When it becomes bearer integration timing t, bearer frames a-7~a-17 and b-7~b-17 which are input in synchronization with the reference frame timing of the sending side are bearer multiplexed after being delayed by time T+Dc (Dc<Db) respectively and output. In the receiving side, bearer frames a-7~a-17 and b-7~b-17 which are received in the receiving side and bearer separated are delayed by time Dc' (=T-Dc) respectively and output. Therefore, the bearer frames a-7~a-17 and b-7~b-17 which were input after the bearer integration timing t in the sending side are output from the receiving side after 2 frame period (2T) delay in total.

In regard to continuity of output data in the receiving side, the bearer frames from a-0 to a-6 and b-0~b-6 are output by 2 frame period after the bearer integration timing t. After that, bearer integrated bearer frames a-7~a-17 and b-7~b-17 are output continuously.

When delay control methods shown in FIG. 12, 13 and 14 are compared, bearer integration is performed to frame offsets Dc>Da, Db in the method shown FIG. 12, and bearer integration is performed to frame offsets Dc<Da, Db. Therefore, according to the second embodiment of the present invention, any bearer service (A) which has any frame offset (Da) can be integrated into a bearer service of any frame offset Db, in addition, any bearer services (A, B) which have any frame offsets (Da, Db) can be integrated into a bearer service of any frame offset Dc.

Figure 15:
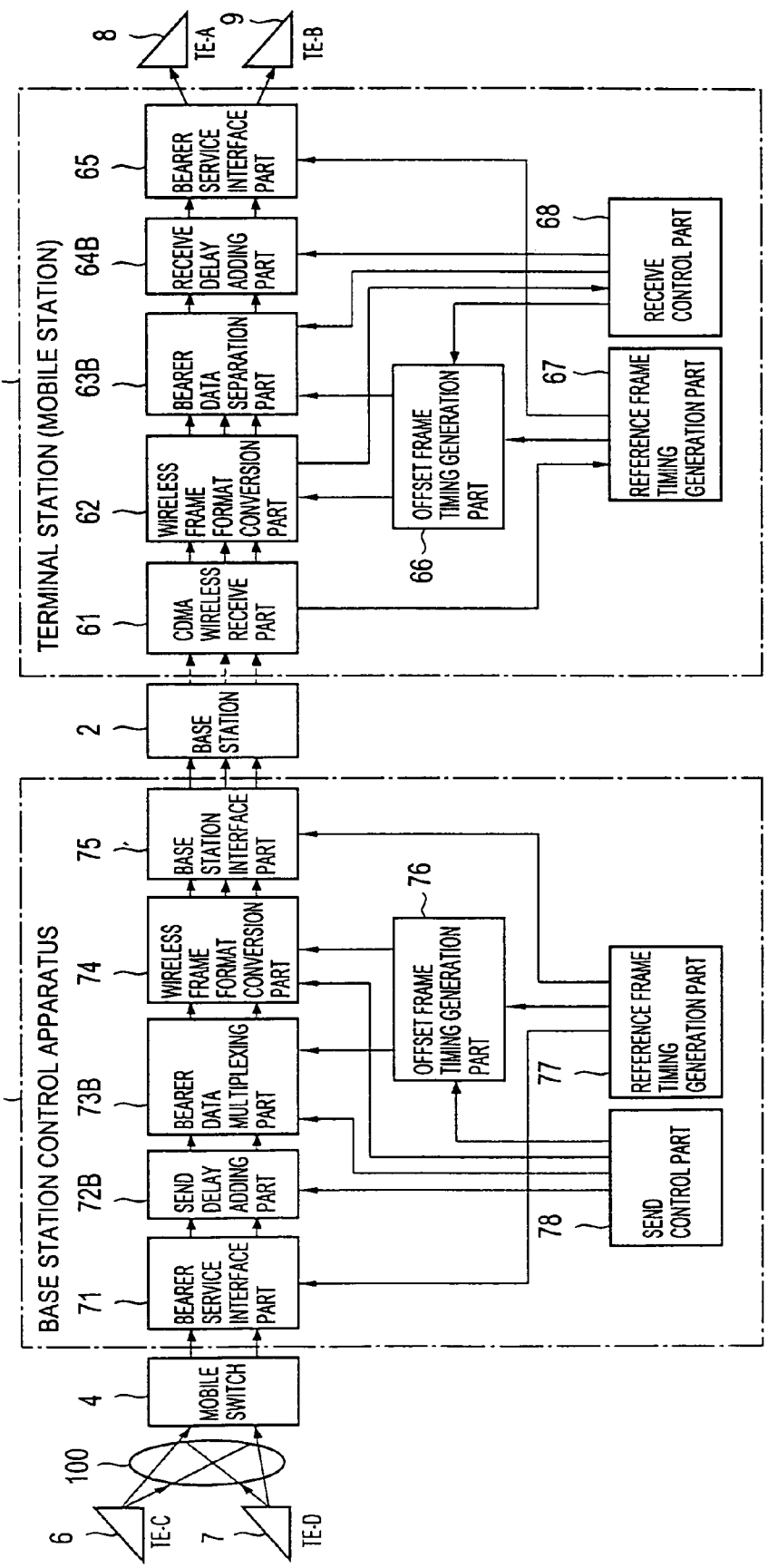
FIG. 15 shows a block diagram of a part of a mobile communication system according to a third embodiment of the present invention.

FIG. 15 shows a block diagram of a part of a mobile communication system according to a third embodiment of the present invention. According to the configuration shown in FIG. 15, control of delay allocation of 2 frame period 2T in total is shared between the sending side and the receiving side, and delay of wireless transmission data which occurs when bearer integration is performed can be improved.

In FIG. 15, 72B indicates a send delay adding part which can output two kinds of delay data simultaneously for each bearer service in accordance with set send delay, 73B indicates a bearer data multiplexing part which can set timing of bearer multiplexing for each bearer service such that each bearer data input from the send delay adding part 72B becomes two wireless channels for the terminal station 1 simultaneously, 63B indicates a bearer separation part which outputs bearer data multiplexed irregularly as two kinds of bearer data for each bearer service in accordance with the receive control part 68, 64B indicates a receive delay adding part which stores bearer data for adding set receive delay and output the bearer data to the bearer service interface part 65. Other parts may be the same as that described with FIG. 9.

FIG. 16 and FIG. 17 shows timing charts (A) and (B) respectively for bearer integration control according to the third embodiment of the present invention. FIG. 16 and FIG. 17 shows the case wherein bearer services A and B in communication having frame offset Da and Db respectively are integrated into a bearer service of a frame offset Dc. In the figures, TE-C and TE-A are connected by the bearer service A (transmission rate Sa) on the wireless channel A (frame offset Da), and TE-D and TE-B are connected by the bearer service B (transmission rate Sb) on the wireless channel B (frame offset Db). At this time, the total time of delays which are set in the send delay adding part 72B and receive delay adding part 64B is set to be two wireless frame periods (2T). When a wireless channel C (frame offset Dc) which can accommodate the two channels (transmission rate=Sa+Sb) becomes available, the system operates as follows.

When the frame offset Dc of the wireless channel C is smaller than the frame offset Da/Db of the wireless channel A or B, the send control part 78 and the receive control part 68 select a bearer service (the bearer service A in the case shown in FIG. 16) and set bearer integration timing A first. The send delay adding part 72B delays data of the bearer service A which is input before the bearer integration timing A by the period of the frame offset Da and outputs the data to the bearer data multiplexing part 73B. In addition, the send delay adding part 72B delays by T+Dc the bearer frame a-7 which is first data of the frame offset Dc in data input after the timing A, and outputs a-7 after data output so far. At this time, a gap of T+Dc-Da arises in the output data. Bearer frames a-8~a-17 after the a-7 are output to the bearer data multiplexing part 73B as separate signals after being delayed by a time period corresponding to the frame offset Dc.

As for data of the bearer service B, bearer frames b-0~b-8 input by the bearer integration timing B are delayed by a time corresponding to the frame offset Db. In addition, bearer frames b-9~b-17 input after that are delayed by a time corresponding to the frame offset Dc and output to the bearer data multiplexing part 73B as separate signals.

The bearer data multiplexing part 73B time-division multiplexes the two bearer frames a-7 and a-8 after bearer integration of the bearer service A in which the bearer integration timing has been provided, and outputs the data to the wireless frame format conversion part 74 as data to be sent by the wireless channel C. Bearer frames b-7, b-8 and the like of the bearer service B which are input before the bearer timing B are left as they are, and the bearer frame b-9 of the bearer service B which is input after the timing B is time-division multiplexed with the bearer frame a-9 of the bearer service A and output to the wireless frame format conversion part 74.

The bearer data separation part 63B in the terminal station 1 outputs two kinds of bearer frames of a-7 and a-8~a-17 for each bearer service in accordance with the order of the bearer integration timing A and B which are set by the receive control part 68 from input bearer data. The receive delay adding part 64B delays by 2T-Da the bearer frames up to a-6 which are input before first frame offset Dc from the bearer integration timing A in the sending side and outputs the data. In addition, the receive delay adding part 64B delays by T-Dc the bearer frame a-7 which is input right after the frame offset, and delays the bearer frames a-8~a-17 which are input after that by 2T-Dc. In addition, the receive delay adding part 64B delays by 2T-Db bearer frames up to the bearer frame b-8 which are input before the frame offset Dc from the bearer integration timing B and outputs the bearer frames, and delays the bearer frames b-9~b-17 which are input after that by 2T-Dc and outputs the bearer frames.

Since the sum of send delay and receive delay is set to be two wireless frame periods (2T) at all times, data which is input from the bearer service interface part 71 of the base station control apparatus 3 and output from the bearer service interface part 65 of the terminal station 1 has always the same delay time. Therefore, when the frame offset after bearer integration is smaller than the frame offset before bearer integration, the bearer service A and the bearer service B can be integrated without instantaneous interruption.

When bearer integration data of the wireless channel C in FIG. 13 is compared with bearer integration data of the wireless channel C in FIG. 16, bearer multiplexed frames a-9 and b-9 in FIG. 16 are sent at the time when the bearer multiplexed frames a-8 and b-8 are sent in FIG. 13. This relation is the same after that. That is, the sending phase of the bearer multiplexed frame shown in FIG. 16 is one frame advanced. This shows that substantial delay of data shown in FIG. 16 is smaller than that shown in FIG. 13 when data is bearer integrated into the wireless channel C of the same condition. Thus, according to the third embodiment of the present invention, when the above-mentioned bearer integration is performed a plurality of times, accumulative increase of signal delay can be suppressed to be small.

Figure 18:
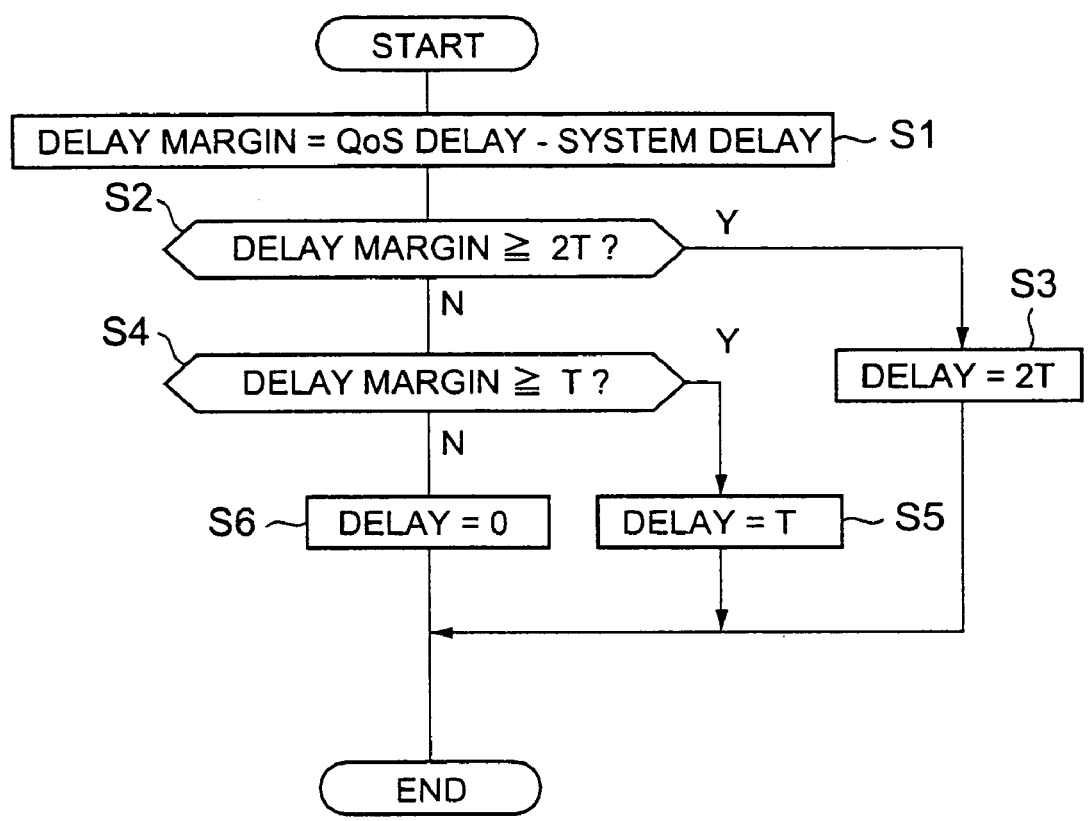
FIG. 18 is a flowchart showing a process for determining a bearer service integration pattern according to an embodiment.

FIG. 18 is a flowchart showing a process for determining a bearer service integration pattern in which an allowable bearer integration pattern is determined from the maximum delay allowable time of a communication service which is specified by QoS (Quality Of Service) parameter and system delay time (wireless transmission delay, signal processing delay and the like). There are three bearer integration patterns which can be selected.

(0): bearer integration method according to the conventional technique (no delay)
(1): bearer integration method according to the first embodiment of the present invention (delay T)
(2): bearer integration method according to the second and third embodiments of the present invention (delay 2T)

According to the method (0), bearer integration is possible only when wireless channels before and after bearer integration have the same frame offset, in which delay is not added between the sending side and the receiving side. According to the method (1), bearer integration can be performed only to a wireless channel which has the frame offset larger than both offsets of integrated bearer services, in which the sum of delay between the sending side and the receiving side is 2T. According to the method (2), bearer integration is possible regardless of the offsets of the integrated bearer services, in which the sum of delay between the sending side and the receiving side is 2T. Since the probability for being able to reserve a wireless channel which can be used for bearer integration is determined according to the range of choices of the offsets of the wireless channel, the probability becomes smaller in the order of the method (2)->the method (1)->the method (0). However, delay which exceeds the maximum delay allowable time for a specified QoS parameter can not be added. The process for determining the bearer service integration pattern according to the embodiment is prepared in consideration of this.

In step 1, delay time (delay margin) which can be added to the system is obtained by "delay margin=QoS delay−system delay". In step 2, it is determined whether delay margin≧2T (two frame period in a wireless channel) is satisfied or not. If YES, the method (2) is selected in step 3. If NO, it is determined whether delay margin≧T is satisfied or not in step 4. If YES, the method (1) is selected in step 5. If NO, the method (0) is selected in step 6. This process is a pattern finding process in which the order of priority is (2)>(1)>(0). By determining the bearer integration method according to this process, the range of choices of the frame offset of the wireless channel can be fully extended. Thus, the transition time for bearer integration can be decreased.

Figure 19:
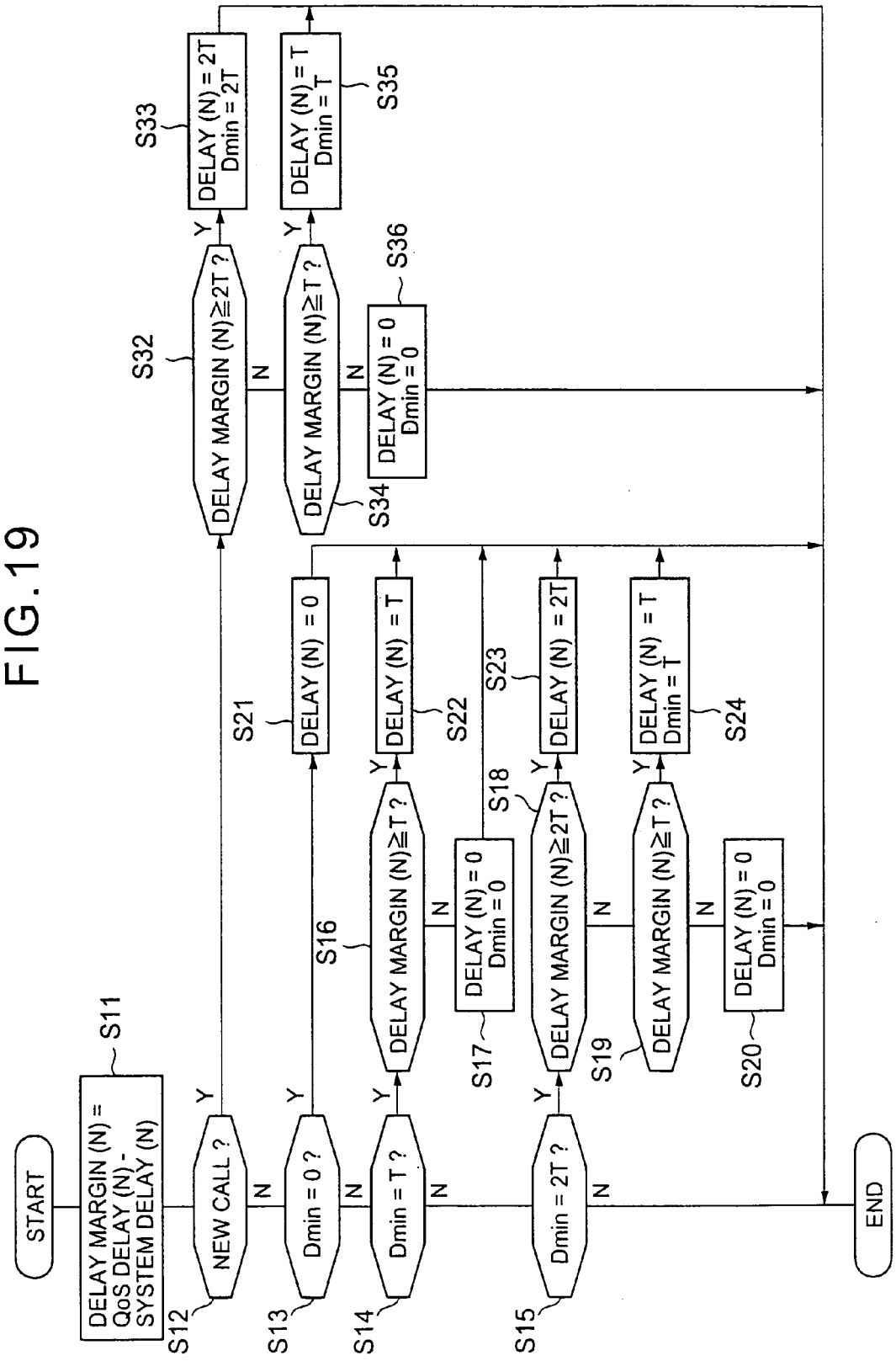
FIG. 19 is a flowchart showing another embodiment of the process for determining the bearer integration pattern.

FIG. 19 is a flowchart showing another embodiment of the process for determining the bearer integration pattern. According to this process, at the time of connecting bearer services, the bearer integration pattern is determined from QoS delay and the difference between transmission delays of bearer services at the time of simultaneous connection which can be defined by each bearer service.

In the case when wireless channels between the different terminals TE-A and TE-B are integrated as shown in FIG. 9, transmission delay deference between the bearer services A and B is not a problem if each of the transmission delay is equal to or smaller than the maximum delay allowable time specified by the QoS parameter. However, for a service such as a high speed digital line service (bearer service defined by G.703 or I.431) in which it is required that each channel has the same transmission delay, a bearer service connected to a terminal first and a bearer service connected to the terminal after that should have the same transmission delay (that is, the same bearer integration pattern). However, delay which exceeds the maximum delay allowable time of the QoS parameter specified according to the newly connected bearer service can not be allowable. The process for determining a bearer service integration pattern according to this embodiment is prepared in consideration of this situation.

In step 11, delay margin (N) is obtained by "delay margin (N)=QoS delay (N)−system delay (N)". Here, (N) is a bearer allocation number for the same terminal station. In step 12, it is determined that the received call is a new call (N=0) for a terminal station. When it is the new call, the process goes to step 35 and a bearer integration pattern can be selected in the same way as shown in FIG. 18. The steps 32–36 corresponds to the steps 2–6 in FIG. 18 respectively. However, in step 33, it is stored that the minimum value Dmin of the bearer integration pattern selected for the new call is 2T. The same holds true for the steps 35 and 36. After that, a bearer service connected to the same terminal station can not exceeds the value of the minimum delay bearer integration pattern Dmin.

When it is determined that the received call is not a new call (N≠0), it is determined whether Dmin=0 is satisfied or not for the terminal station in step 13. When Dmin=0, the delay patter is determined to be (N)=0 in step 21. When Dmin≠0, it is determined whether Dmin=T for the terminal station in step 14. When Dmin=T, it is determined whether the delay margin at this time is (N)≧T or not in step 16. When Dmin=T and the delay margin (N)≧T for the terminal station, the delay margin is determined to be (N)=T in step 22. When (N)≧T is not satisfied, the delay pattern is determined to be (N)=0 in step 17 and Dmin is undated to 0. When Dmin≠0 in step 14, it is determined whether Dmin=2T or not for the terminal station in step 15. When Dmin=2T, it is determined whether the delay margin (N)>2T is satisfied or not in step 18. When Dmin=2T and the delay margin (N)≧T, the delay pattern is determined to be (N)=2T in step 23. When the delay margin (N)≧2T is not satisfied, it is determined whether the delay margin at this time is (N)≧T or not in step 19. When Dmin=T and the delay margin (N)≧T for the terminal station, the delay pattern is determined to be (N)=T in step 24, and Dmin is updated to T. When the delay margin (N)≧T is not satisfied in step 19, the delay pattern is determined to be (N)=0 in step 20 and Dmin is updated to 0.

By determining the bearer integration method according to this procedure, the transmission delay difference between bearer services connected to the same terminal station can be minimized while the maximum delay allowable time for the specified QoS parameter is maintained.

As mentioned above, according to the present invention, bearer integration becomes available without instantaneous interruption between wireless channels of different frame offsets/transmission rates by readjusting delay allocation between the sending side and the receiving side. Thus, it becomes possible that more bearer services can be integrated speedily and the number of available wireless channels can be increased.

In the above-mentioned embodiments, cases in which a plurality of bearer services are integrated is described. In addition, it is possible to separate an integrated bearer service without instantaneous interruption by changing delay allocation between the sending side and the receiving side.

In the above-mentioned embodiments, a mobile communication system by the CDMA method is described as an example application. In addition, the present invention can be applied to other communication systems such as TDMA and the like.

The present invention is not limited to the specifically disclosed embodiments, and variations and modifications may be made without departing from the scope of the invention.

What is claimed is:

1. A bearer integration method for integrating a plurality of bearer services into a wireless channel by performing time-division multiplexing/demultiplexing, said bearer integration method comprising the steps of:

inputting each bearer frame of a bearer service in synchronization with reference frame timing of a period T in a sending side;

delaying each bearer frame of said bearer service by one frame period by allocating delays A (0<A<T) and A' (=T−A) between the sending side and a receiving side wherein the delay A is allocated in the sending side as a frame offset and the delay A' is allocated in the receiving side, and wherein the sending side and the receiving side are synchronized with the reference frame timing of the period T;

outputting each bearer frame of said bearer service in the receiving side; and integrating said bearer service into a wireless channel with another bearer service in which delays B (A<B<T) and B' (=T−B) are allocated between the sending side and the receiving side wherein the delay B is allocated in the sending side as a frame offset and the delay B' is allocated in the receiving side.

2. The bearer integration method as claimed in claim 1, wherein, when integrating bearer service in which each bearer service has different delay allocation, said bearer services are integrated into a wireless channel which has a delay equal to or larger than the maximum delay in said bearer services.

3. The bearer integration method as claimed in claim 1, wherein two kinds and two systems of delay allocation are set for each bearer service, said bearer integration method further comprising the step of:

integrating one or more bearer services having any delay allocation into another bearer service having any delay allocation.

4. The bearer integration method as claimed in claim 1, wherein a point of delay allocation between the sending side and the receiving side corresponds to frame offset timing.

5. A bearer integration method for integrating a plurality of bearer services into a wireless channel by performing time-division multiplexing/demultiplexing, said bearer integration method comprising the steps of:

inputting each bearer frame of a bearer service in synchronization with reference frame timing of a period T in a sending side;

delaying each bearer frame of said bearer service by two frame period by allocating delays A (0<A<T) and A' (=2T−A) between the sending side and a receiving side wherein the delay A is allocated in the sending side as a fame offset and the delay A' is allocated in the receiving side, and wherein the sending side and the receiving side are synchronized with the reference frame timing of the period T;

outputting each bearer frame of said bearer service in the receiving side; and integrating said bearer service into a wireless channel with another bearer service in which delays T+B (0<B c T) and B' (=T−B) are allocated between the sending side and the receiving side wherein the delay B is allocated in the sending side as a frame offset and the delay B' is allocated in the receiving side.

6. The bearer integration method as claimed in claim 5, further comprising the step of:
   integrating a first bearer service, in which delays A ($0<=A<=T$) and A' ($=2T-A$) are associated, with a second bearer service, in which delays B ($0<=B<=T$) and B' ($-2T-B$) are allocated between the sending side and the receiving side, into a wireless channel C, in which delays T+C ($0<=C<=T$) and C' ($=T-C$) are allocated.

7. The bearer integration method as claimed in claim 6, wherein two kinds and two systems of delay allocation are set for each bearer service, said bearer integration method further comprising the steps of:
   delaying, in the sending side, a first bearer frame of said first bearer service which is input after bearer integration timing by a period of T+C, delaying bearer frames of said first bearer service after a second bearer frame by a period C;
   delaying, in the sending side, bearer frames of said second bearer service after a third bearer frame of said second bearer service witch is input after bearer integration timing by a period C, integrating the first and the second bearer services into the wireless channel C and sending integrated data;
   delaying, in the receiving side, the first bearer frame by a period T–C, delaying said bearer frames after the second bearer frame by a period 2T–C, and outputting these bearer frames; and
   delaying, in the receiving side, said bearer frames of said second bearer service after the third bearer frame by a period 2T–C and outputting said bearer frames.

8. A bearer integration method for integrating a plurality of bearer services into a wireless channel by performing time-division multiplexing/demultiplexing, said bearer integration method comprising the steps of;
   obtaining a delay margin DM which can be allocated between a sending side and a receiving side by subtracting a system delay from a maximum allowable delay defined by a service quality;
   When DM$>=$2T in which T is a reference fame period, performing a bearer integration method comprising the steps of: delaying input bearer service data by two frame periods by allocating delays A ($0<=A<=T$) and A' ($=2T-A$); and integrating said bearer service data into a wireless channel with another bearer service data in which delays T+B ($0<=B<=T$) and B' ($=T-B$) are allocated, or, performing a bearer integration method for integrating a bearer service in which delays A ($0<=A<=T$) and A' ($=2T-A$) are allocated with another bearer service data in which delays B ($0<=B<=T$) and B' ($=2T-B$) are allocated between the sending side and the receiving side into a wireless channel C in which delays T+C ($0<=C<=T$) and C' ($=T-C$) are allocated;
   When T$<=$DM$<$2T, performing a bearer integration method comprising the steps of: delaying input bearer service data by one flame period by allocating delays A ($0<=A<=T$) and A' ($=T-A$); and integrating said bearer service data into a wireless channel with another bearer service data in which delays B (A$<=$B$<=$T) and B' ($=T-B$) are allocated; and
   When DM$<$T, performing a bearer integration method in which no delay is allocated between the sending side and the receiving side.

9. The bearer integration method as claimed in claim 8, further comprising the step of:
   determining a bearer integration method to be performed by checking conditions in order of DM$>=$2T, T$<=$DM$<$2T, DM$<$T.

10. The bearer integration method as claimed in claim 8, further comprising the step of:
   storing a bearer integration method used before;
   determining a bearer integration method to be used according to said bearer integration method which is stored.

11. The bearer integration method as claimed in claim 10, further comprising the step of:
   when a delay margin of a bearer service to be integrated is smaller than a delay due to said bearer integration method which is stored, selecting a bearer integration method which has a delay suitable for said delay margin of said bearer service to be integrated.

12. A communication system which integrates a plurality of bearer services into a wireless channel by performing time-division multiplexing/demultiplexing, said communication system comprising:
   a send delay adding part which synchronizes with reference frame timing of a period T, delays each bearer frame of one or more bearer services input before bearer integration timing up to each frame offset timing, and delays each bearer frame of the one or more bearer services input after bearer integration timing up to frame offset timing of a channel for bearer integration; and
   a bearer data multiplexing part which time-division multiplexes bearer frames of the one or more bearer service output from said send delay adding part, wherein the bearer frames that are multiplexed are transmitted via a wireless channel;
   a bearer data separation part which time-division demultiplexes the bearer frame of the one or more bearer services that are multiplexed received via the wireless channel; and
   a receive delay adding part which synchronizes with the reference frame timing, delays each bearer frame of the one or more bearer services input before bearer integration timing up to a closest reference frame timing, and delays each bearer frame of the one or more bearer services output from said bearer data separation part after bearer integration timing up to the closest reference frame timing.

* * * * *